United States Patent
Hirano et al.

(10) Patent No.: US 9,415,465 B2
(45) Date of Patent: Aug. 16, 2016

(54) LASER PROCESSING APPARATUS AND LASER PROCESSING METHOD

(71) Applicant: NIPPON STEEL & SUMMITOMO METLA CORPORATION, Tokyo (JP)

(72) Inventors: Koji Hirano, Tokyo (JP); Hirofumi Imai, Tokyo (JP)

(73) Assignee: NIPPON STEEL AND SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/113,120

(22) PCT Filed: Sep. 26, 2012

(86) PCT No.: PCT/JP2012/074714
§ 371 (c)(1),
(2) Date: Oct. 21, 2013

(87) PCT Pub. No.: WO2013/058072
PCT Pub. Date: Apr. 25, 2013

(65) Prior Publication Data
US 2014/0076870 A1  Mar. 20, 2014

(30) Foreign Application Priority Data
Oct. 20, 2011 (JP) ................................ 2011-230298

(51) Int. Cl.
B23K 26/06 (2014.01)
B23K 26/073 (2006.01)
B23K 26/38 (2014.01)

(52) U.S. Cl.
CPC ......... *B23K 26/0608* (2013.01); *B23K 26/0604* (2013.01); *B23K 26/0617* (2013.01); *B23K 26/0648* (2013.01); *B23K 26/0734* (2013.01); *B23K 26/38* (2013.01)

(58) Field of Classification Search
CPC ........... B23K 26/0617; B23K 26/0648; B23K 26/38; B23K 26/0608; B23K 26/0734
USPC .......................... 219/121.61, 121.67–121.72; 385/11–117, 119–121
See application file for complete search history.

(56) References Cited

U.S. PATENT DOCUMENTS 5,354,414 A * 10/1994 Feygin ........................... 216/34
2007/0045256 A1* 3/2007 Kurahashi ................ 219/121.73
(Continued)

FOREIGN PATENT DOCUMENTS

EP 2 399 703 A1 12/2011
JP 4-339586 A 11/1992
(Continued)

OTHER PUBLICATIONS

Hilton, "Cutting Stainless Steel with Disc and CO2 Lasers," Proceedings of LAMP2009—the 5th International Congress on Laser Advanced Materials Processing, 2009, pp. 1-6.
(Continued)

*Primary Examiner* — Jianying Atkisson
(74) *Attorney, Agent, or Firm* — Birch, Stewart, Kolasch & Birch, LLP

(57) ABSTRACT

[Object]
To provide a laser processing apparatus and a laser processing method which are capable of reducing roughness of a cut surface in laser cutting using laser beams transmitted through optical fibers.
[Solution]
A laser processing apparatus according to the present invention includes at least one laser oscillator configured to emit laser beams, a plurality of optical fibers configured to transmit the emitted laser beams, and at least one optical element configured to focus the laser beams emitted from the optical fibers and irradiate a surface of a workpiece with the focused laser beams. At output ends of the optical fibers, the output ends of the plurality of optical fibers are placed in one or a plurality of ring shapes. Laser beams transmitted through the plurality of optical fibers placed on at least an outermost ring of the ring shapes each have a linear polarization, and polarization directions of the linearly polarized laser beams emitted from the output ends of the plurality of optical fibers are arranged radially around a center of the outermost ring.

28 Claims, 19 Drawing Sheets

(56) References Cited

U.S. PATENT DOCUMENTS

| | | |
|---|---|---|
| 2007/0145024 A1 | 6/2007 | Salama et al. |
| 2009/0218326 A1 | 9/2009 | Chouf et al. |
| 2010/0044353 A1* | 2/2010 | Olsen .................. 219/121.67 |

FOREIGN PATENT DOCUMENTS

| | | |
|---|---|---|
| JP | 2003-154477 A | 5/2003 |
| JP | 2004-291031 A | 10/2004 |
| JP | 2007-065280 A | 3/2007 |
| JP | 2009-525189 A | 7/2009 |
| JP | 2010-508149 A | 3/2010 |
| JP | 4505190 B2 | 7/2010 |
| JP | 2010-194558 A | 9/2010 |
| JP | 2010-274292 A | 12/2010 |
| WO | WO 2007/088295 A1 | 8/2007 |
| WO | WO 2008/052547 A1 | 5/2008 |

OTHER PUBLICATIONS

International Search Report issued in PCT/JP2012/074714, mailed on Dec. 11, 2012.

Written Opinion of the International Searching Authority issued in PCT/JP2012/074714, mailed on Dec. 11, 2012. (Japanese).

European Search Report issued in Application No. 12842173.2 dated May 4, 2015.

* cited by examiner

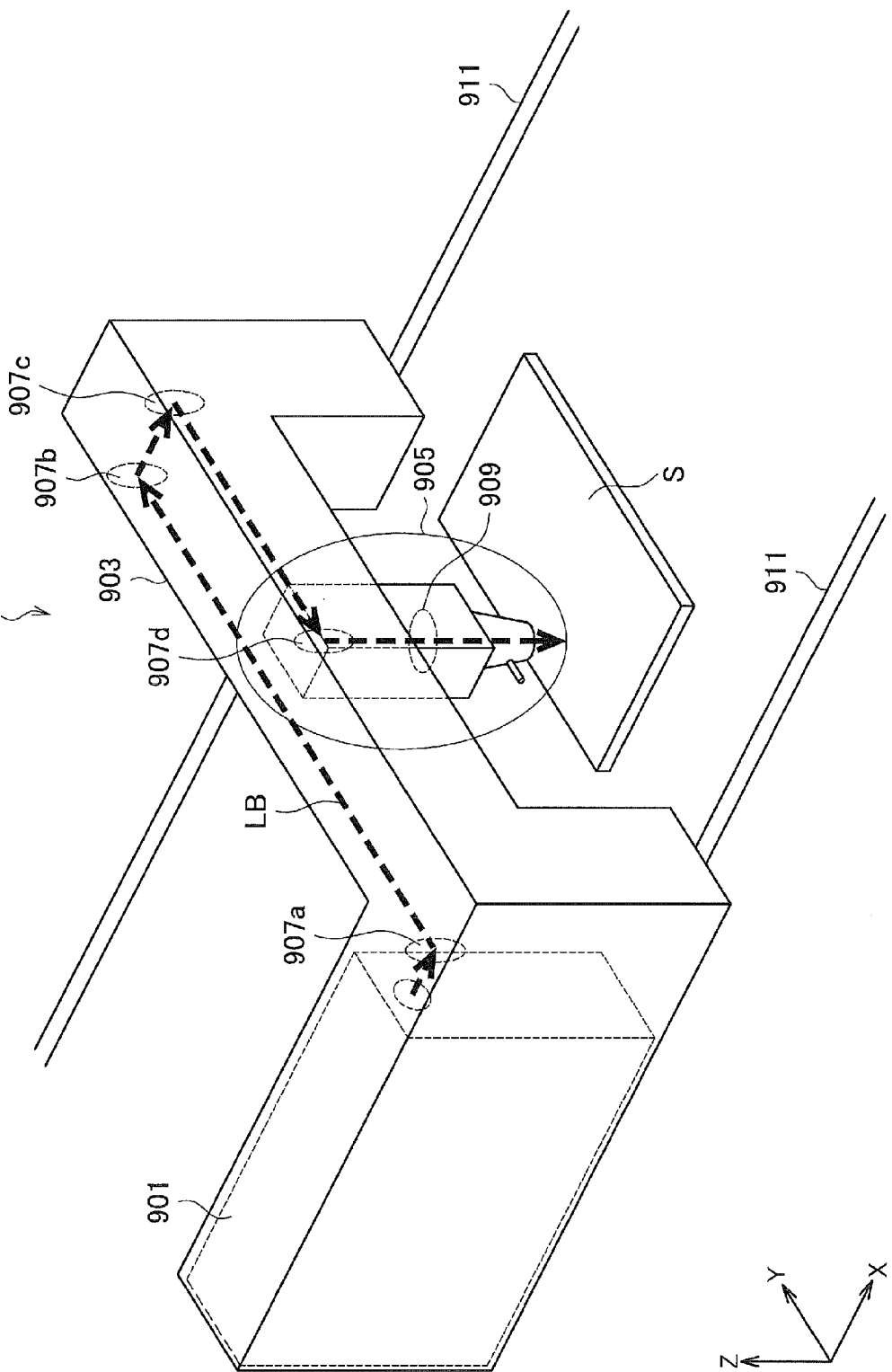

LASER PROCESSING APPARATUS AND LASER PROCESSING METHOD

TECHNICAL FIELD

The present invention relates to a laser processing apparatus and a laser processing method.

BACKGROUND ART

With developments in laser oscillators, laser processing technology for subjecting materials to removal processing, bonding processing, and surface reforming using a laser beam, is gaining widespread use. In particular, laser cutting technology, which is one of the technologies for processing metal materials using a high power output laser beam, has various advantages as follows: post-treatment is not necessary; automation is possible; and high-speed cutting is possible. Accordingly, the laser cutting is widely used in industries for cutting various types of materials.

Hereinafter, a laser processing apparatus of the prior art will be briefly described.

FIG. 24 is an explanatory diagram illustrating a laser processing apparatus of the prior art, which is used for cutting a steel plate. In a laser processing apparatus 900 of the prior art, a $CO_2$ laser oscillator 901, which uses $CO_2$ gas as a laser medium, is often used as a laser oscillator. A laser beam LB emitted from the $CO_2$ laser oscillator 901 is transmitted through an optical path provided inside a main body 903 and a processing head 905 of the laser processing apparatus 900, and is focused and emitted onto a surface of a steel plate S, which is a workpiece.

Specifically, as shown in FIG. 24, a laser beam LB having a wavelength of 10.6 µm emitted from the $CO_2$ laser oscillator 901 is reflected and transmitted by mirrors 907a to 907d provided on the optical path, and is focused onto the surface of the steel plate by a focusing lens 909 provided inside the processing head 905. The steel plate S which has absorbed the laser beam LB is heated by energy of the laser beam LB and is melted. Assist gas such as oxygen or inert gas is sprayed from a nozzle equipped at the end of the processing head 905 in the coaxial direction with the laser beam LB, and in this way, the molten steel is removed to a lower part (in the negative direction of the Z-axis in FIG. 24) of the workpiece.

The laser processing apparatus 900 translates the focus point of the laser beam LB within the XY-plane while emitting the laser beam LB, and thereby continuously melting and removing the workpiece material. As a result thereof, a part of the workpiece at or near a translation line of the laser beam LB is removed, and the workpiece is finally cut. Here, the part of the workpiece that has been removed by the irradiation with the laser beam LB is referred to as "kerf". Further, polarization of the laser beam emitted from the $CO_2$ laser oscillator 901 is generally made circular polarization, in order that the processing is kept uniform even in a case where the workpiece is cut in any directions on the XY-plane.

In the translation in the X-axis direction performed by the laser processing apparatus 900 is realized by the main body 903 of the laser processing apparatus 900 moving along a guide rail 911 together with the laser oscillator and the processing head. Further, the translation in the Y-axis direction performed by the laser processing apparatus 900 is realized by moving the processing head 905, the processing head 905 including the mirror 907d, the focusing lens 909, a nozzle that sprays assist gas, and the like.

FIG. 25A is a top view when a state in the vicinity of the focus point of the laser beam LB is seen from the upper part of the steel plate S and is enlarged, and FIG. 25B is a cross-sectional view along the center line of a kerf 921 shown in FIG. 25A.

One laser beam LB focused from the upper part is, as shown in FIG. 25A and FIG. 25B, absorbed into the forefront of the kerf (hereinafter, also referred to as kerf front) 923. The laser beam LB is absorbed into the workpiece, and thereby causing melting of the material. The kerf front 923 moves in a cutting movement direction. Further, as shown in FIG. 25B, the position of the kerf front at the bottom surface of the workpiece is delayed compared to the position of the kerf front at the top surface of the workpiece. Accordingly, at the kerf front, a tilted kerf front surface 925 is formed. As shown in FIG. 25B, the molten material (for example, molten steel) runs down the kerf front surface 925 with a force of the assist gas (not shown) that is supplied coaxially with the laser beam LB, and is removed to a part lower than the bottom surface of the material. With the translation of the focus point of the laser beam LB, this phenomenon continuously occurs, thereby forming the kerf 921.

As schematically shown in FIG. 25A and FIG. 25B, after the laser beam LB has passed and the kerf 921 has been formed, a striation 927 remains, on the side surface of the kerf, in a direction perpendicular to the cutting direction. The structure of the striation has certain irregularities and degree of roughness (roughness). The roughness is an important index in evaluating quality of a cut surface in the laser cutting processing, and it is desired that the value of the roughness be minimized.

On the other hand, recently in the field of high power laser processing, solid-state lasers that each emit a laser beam having a wavelength around 1 nm (about 0.5 nm to 2 nm, hereinafter, referred to as "1 nm band" in this description), such as a fiber laser and a disc laser, have increased the power outputs thereof, and have gained attention. Those lasers can each focus a laser beam smaller than a $CO_2$ laser emitting a laser beam having a wavelength of 10.6 nm which has been used conventionally, and as a result thereof, the heating of the workpiece with a higher energy density can be performed. Therefore, those lasers are suitable for high speed processing. Further, those lasers that each emit a laser beam having a wavelength in the 1 nm band have a characteristic that transmission through an optical fiber is available.

As described with reference to FIG. 24, in the laser processing apparatus including a $CO_2$ laser, since it is necessary that the laser beam is reflected by mirrors to be transmitted, it is necessary to drive together the body of the laser oscillator when translation of the focused laser beam was performed, and hence, a huge machine was required. On the other hand, in the case of the laser emitting a laser beam having a wavelength in the 1 nm band capable of being transmitted through an optical fiber, the laser oscillator can be removed from the processing apparatus, and the laser beam can be transmitted through the optical fiber without using the mirrors. Accordingly, the cost needed for manufacturing the machine part can be reduced by the simplification of the apparatus. In addition, the oscillator of the $CO_2$ laser has an oscillator structure in which a laser medium is disposed between two resonators, and hence requires regular resonator alignment adjustment works. On the other hand, the fiber laser and the disc laser have advantages of not practically requiring the resonator alignment adjustment, and thus of being capable of enhancing the working efficiency of the laser processing apparatus. As described above, the advantages obtained by introducing the fiber laser and the disc laser in the laser processing apparatus are tremendous.

However, regarding the cutting of a thick steel plate having a thickness of about 4 mm or more, there is a problem that the level of cut quality obtained by a laser emitting a laser beam having a wavelength in the 1 µm band is lower than the level of cut quality obtained by the $CO_2$ laser. For example, Non-Patent Document 1 reports comparison results obtained by cutting a stainless steel plate using a disc laser and a $CO_2$ laser, and discloses that with a stainless steel plate having a thickness of 6 mm, the cut surface roughness obtained by using the disc laser is extremely greater compared to the cut surface roughness obtained by using the $CO_2$ laser. From the viewpoint of this issue of the quality of a cut surface, the present state is that the $CO_2$ laser is still being used for cutting a thick steel plate with a laser beam, and the cutting of a thick steel plate is not receiving the above-mentioned advantages of using the laser emitting a laser beam having a wavelength in the 1 µm band.

As a suggestion for reducing the roughness of the surface cut by the laser beam having a wavelength in the 1 µm band, Patent Document 1 points out first that beam quality of a laser beam is generally satisfactory in the $CO_2$ laser, and discloses that the cut quality can be enhanced even with the laser beam having a wavelength in the 1 µm band, if a laser beam has satisfactory beam quality (also referred to as beam parameter product (BPP)). However, the fact is clear as disclosed in Non-Patent Document 1, that even when the fiber laser or the disc laser emitting a laser beam having a satisfactory beam quality is used, the quality of the cut surface does not reach the level of quality obtained when the $CO_2$ laser is used. This suggests that the difference in the wavelengths of the laser beams, that is, 1 µm band and 10 µm, changes the cutting phenomenon largely, and also shows the complexity of the issue that it is difficult to apply the knowledge of the cutting using the $CO_2$ laser of the prior art to the cutting using the laser emitting a laser beam having a wavelength in the 1 µm band.

On the other hand, with the use of multiple laser beams each having a wavelength in the 1 µm band transmitted through an optical fiber, spatial intensity distribution of the laser beams can be controlled, and studies have been made for applying the method of controlling the spatial intensity distribution to the laser cutting.

For example, Patent Document 2 discloses technology for obtaining, by placing multiple laser beams in a ring shape, the intensity distribution in which circular laser beams are arranged in the ring shape. According to this technology, sharp rise in laser intensity distribution is realized at the outer edge part of the laser beams, and the technology has a certain effect on roughness suppression with respect to the cutting of a steel plate using assist gas containing oxygen gas as a main component. However, with respect to the cutting using, as the assist gas, gas containing as a main component inert gas such as nitrogen gas or argon gas, which is mainly used for stainless steel or the like, it is difficult to provide a roughness similar to the roughness obtained by using $CO_2$ laser and to exhibit sufficient effects.

Further, Patent Document 3 suggests technology of placing at least one beam for molten material ejection at a rear part of a main laser beam that mainly generates a molten material to assist ejection of the molten material. As disclosed in Patent Document 3, a basic way of thinking this technology is as follows. A surface of the molten material is vaporized by the irradiation with the beam for molten material ejection, and the ejection of the molten material is made to be performed smoothly using high pressure obtained as a reaction force of the vaporization. By making the ejection of the molten material to be performed smoothly, cutting capacity can be enhanced, including increases of cutting speed and cut thickness. However, regarding the quality of a cut surface, the quality chiefly depended on the main laser beam used for generating a molten material, except for a deep part near to the bottom surface of the material at which an action of the beam for molten material ejection appears. Thus, no significant quality enhancement could be achieved compared with the case of using a usual one beam. Further, according to this technology, the spatial intensity distribution of laser beams focused on a surface of a material was asymmetric. Accordingly, in order to support uniform cutting characteristics in any directions, an accurate mechanism was necessitated for rotating the spatial intensity distribution of laser beams in accordance to the change of the cutting direction, and hence, there was a drawback that the apparatus increased the complexity thereof.

PRIOR ART DOCUMENT

Patent Document

[Patent Document 1] JP 2009-525189T
[Patent Document 2] JP 4505190B
[Patent Document 3] JP 2010-508149T Non-Patent Document

[Non-Patent Document 1] P. A. Hilton, "Cutting Stainless Steel with Disc and $CO_2$ Lasers", Proceedings of LAMP2009—the 5th International Congress on Laser Advanced Materials Processing, 2009

DISCLOSURE OF THE INVENTION

Problems to be Solved by the Invention

As described above, in order to realize laser processing (in particular, laser cutting) using a laser beam having a wavelength in the 1 µm band transmitted through an optical fiber, it is desirable to develop technology capable of reducing cut surface roughness.

The present invention has been made in view of the circumstances described above, and an object of the present invention is to provide a laser processing apparatus and a laser processing method which are capable of reducing the roughness of the cut surface in the laser cutting using a laser beam transmitted through an optical fiber.

Means for Solving the Problems

In order to solve the above problems, according to an aspect of the present invention, there is provided a laser processing apparatus which processes a workpiece by guiding laser beams emitted from a laser oscillator, focusing the laser beams, and irradiating a surface of the workpiece with the focused laser beams, the laser processing apparatus including at least one laser oscillator configured to emit the laser beams, a plurality of optical fibers configured to transmit the emitted laser beams, and at least one optical element configured to focus the laser beams emitted from the optical fibers and irradiate the surface of the workpiece with the focused laser beams. At output ends of the optical fibers, the output ends of the plurality of optical fibers are placed in one or a plurality of ring shapes. Laser beams transmitted through the plurality of optical fibers placed on at least an outermost ring of the ring shapes each have a linear polarization, and polarization directions of the linearly polarized laser beams emitted from the output ends of the plurality of optical fibers are arranged radially around a center of the outermost ring.

In the above-mentioned laser processing apparatus, one of the optical fibers may further be placed at a central part of the ring.

The output ends of the above-mentioned plurality of optical fibers may be placed in a plurality of ring shapes which share a common center. Through the optical fibers placed in the ring shapes inside the outermost ring, polarized laser beams may be transmitted, where the polarized laser beams have polarization directions arranged radially around a center of the ring.

The output ends of the above-mentioned plurality of optical fibers may be placed in a plurality of ring shapes which share a common center. Through the optical fibers placed in the ring shapes inside the outermost ring, laser beams may be transmitted, where the laser beams are non-polarized laser beams.

The above-mentioned at least one optical element may include a collimator lens that changes laser beams emitted from the optical fibers into parallel light beams, and a focusing lens that focuses the parallel light beams emitted from the collimator lens.

The above-mentioned plurality of optical fibers may be connected to a collimator fixing holder in which a plurality of collimators each having the collimator lens are placed in one or a plurality of ring shapes. The focusing lens may be a spherical lens having spherical aberration or an aspherical lens having a predetermined curved surface. The laser beams emitted from the focusing lens may be focused and the surface of the workpiece may be irradiated with the focused laser beams.

The above-mentioned collimators placed on an outermost ring of the ring shapes may be set in a state of being tilted radially outward or inward around a central axis direction of the ring of the collimator fixing holder.

A wedge may be placed between the collimator fixing holder and the focusing lens, where the wedge tilts the laser beams emitted from the collimators radially outward or inward around a central axis direction of the ring of the collimator fixing holder.

The above-mentioned laser oscillator may be a fiber laser or a disc laser.

Linear polarization directions of the laser beams transmitted through the above-mentioned plurality of optical fibers placed on the outermost ring may be varied in an identical rotation direction between the laser beams that are adjacent to each other, and an angle between linear polarization directions of two laser beams that are adjacent to each other may be 60 degrees or less.

Six or more of the above-mentioned optical fibers may be placed on the outermost ring.

Further, in order to solve the above problems, according to another aspect of the present invention, there is provided a laser processing method for processing a workpiece by guiding laser beams emitted from a laser oscillator, focusing the laser beams, and irradiating a surface of the workpiece with the focused laser beams, the laser processing method including transmitting the laser beams emitted from at least one laser oscillator through a plurality of optical fibers, and, by using at least one optical element that focuses the laser beams and irradiates the surface of the workpiece with the focused laser beams, focusing the laser beams emitted from the respective optical fibers, and irradiating the surface of the workpiece with the focused laser beams. At output ends of the optical fibers, the output ends of the plurality of optical fibers are placed in one or a plurality of ring shapes. Laser beams transmitted through the plurality of optical fibers placed on at least an outermost ring of the ring shapes each have a linear polarization, and polarization directions of the linearly polarized laser beams emitted from the output ends of the plurality of optical fibers are arranged radially around a center of the outermost ring.

In the above-mentioned laser processing method, one of the optical fibers may further be placed at a central part of the ring.

The output ends of the above-mentioned plurality of optical fibers may be placed in a plurality of ring shapes which share a common center. Through the optical fibers placed in the ring shapes inside the outermost ring, polarized laser beams may be transmitted, where the polarized laser beams have polarization directions arranged radially around a center of the ring.

The output ends of the above-mentioned plurality of optical fibers may be placed in a plurality of ring shapes which share a common center. Through the optical fibers placed in the ring shapes inside the outermost ring, laser beams may be transmitted, where the laser beams are non-polarized laser beams.

The above-mentioned at least one optical element may include a collimator lens that changes laser beams emitted from the optical fibers into parallel light beams, and a focusing lens that focuses the parallel light beams emitted from the collimator lens.

The above-mentioned plurality of optical fibers may be connected to a collimator fixing holder in which a plurality of collimators each having the collimator lens are placed in one or a plurality of ring shapes. The focusing lens may be a spherical lens having spherical aberration or an aspherical lens having a predetermined curved surface. The laser beams emitted from the focusing lens may be focused and the surface of the workpiece may be irradiated with the focused laser beams.

The above-mentioned collimators placed on an outermost ring of the ring shapes may be set in a state of being tilted radially outward or inward around a central axis direction of the ring of the collimator fixing holder.

A wedge may be placed between the collimator fixing holder and the focusing lens, where the wedge tilts the laser beams emitted from the collimators radially outward or inward around a central axis direction of the ring of the collimator fixing holder.

The above-mentioned laser oscillator may be a fiber laser or a disc laser.

Linear polarization directions of the laser beams transmitted through the above-mentioned plurality of optical fibers placed on the outermost ring may be varied in an identical rotation direction between the laser beams that are adjacent to each other, and an angle between linear polarization directions of two laser beams that are adjacent to each other may be 60 degrees or less.

Six or more of the above-mentioned optical fibers may be placed on the outermost ring.

Effect of the Invention

As described above, according to the present invention, the roughness of the cut surface can be reduced by placing the output ends of the plurality of optical fibers in one or more ring shapes, by letting the laser beams transmitted through the plurality of optical fibers placed on at least the outermost ring of the ring shapes each have a linear polarization, and by making the polarization directions of the linearly polarized laser beams emitted from the output ends of the plurality of optical fibers to be arranged radially around the center of the outermost ring.

BRIEF DESCRIPTION OF THE DRAWINGS

FIG. 24 is an explanatory diagram illustrating a laser processing apparatus of the prior art.

MODE FOR CARRYING OUT THE INVENTION

Figure 1:
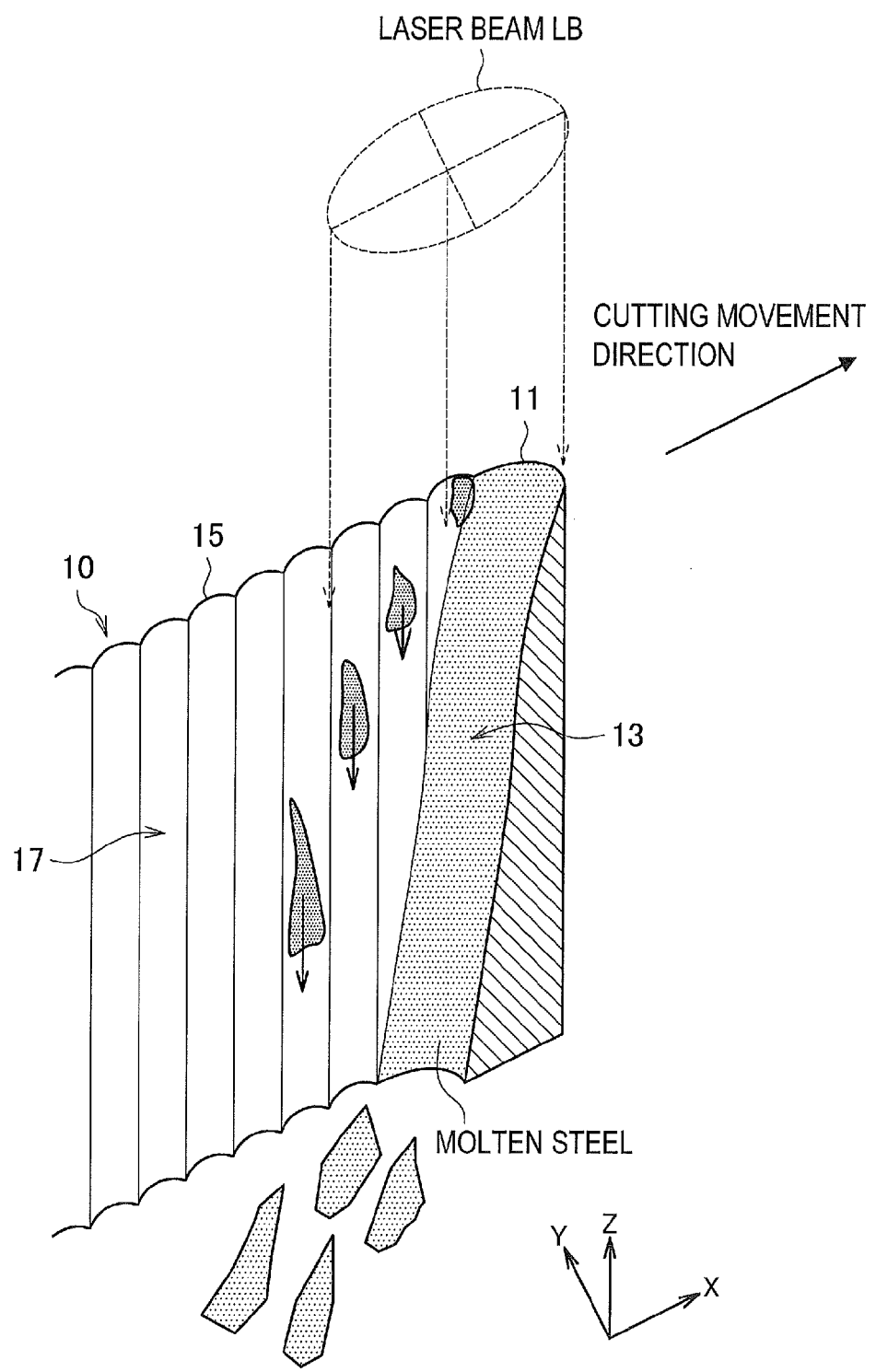
FIG. 1 is an explanatory diagram illustrating mechanism for generation of cut surface roughness.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

(Mechanism for Generation of Cut Surface Roughness and Knowledge Obtained by Solving Mechanism)

Before describing a laser processing apparatus and a laser processing method according to an embodiment of the present invention, a description will be made of a mechanism for generation of cut surface roughness that has been found by the inventor of the present invention.

As described above, no development has been achieved regarding studies on a solution for the problem that the cut surface roughness obtained by using the laser emitting a laser beam having a wavelength in the 1 µm band is greater than the cut surface roughness obtained by using the $CO_2$ laser. As a background for the fact that the studies on the solution are not making progress, there is a problem that the mechanism for generation of roughness is not sufficiently known.

That is, regarding basic studies on improvements in laser cutting technology, much knowledge including the mechanism has been accumulated with regard to cutting ability such as maximum cutting speed and cuttable thickness. However, with regard to the generation of roughness, there has been little progress on understanding of the phenomenon including the case of cutting using a $CO_2$ laser of the prior art. In addition thereto, as described above, since the difference in the wavelengths of the laser beams, that is, 1 µm band and 10 µm, changes the cutting phenomenon largely, the knowledge obtained from the cutting using the $CO_2$ laser of the prior art cannot be applied to the cutting using the laser emitting a laser beam having a wavelength in the 1 µm band. For those reasons, in order to reduce the roughness of the surface cut by the laser beam having a wavelength in the 1 µm band, it is necessary to make progress in understanding a process of generation of roughness on the surface cut by the laser beam having this wavelength band.

The inventors of the present invention have carefully studied regarding those aspects, have succeeded in obtaining important knowledge regarding a mechanism for generation of cut surface roughness caused by the laser cutting using the laser beam having a wavelength in the 1 µm band, and have found a solution for reducing the roughness. Hereinafter, with reference to FIG. 1, the mechanism for generation of cut surface roughness found by the inventors of the present invention will be specifically described with reference to FIG. 1.

First, the inventors of the present invention have investigated a mechanism for generation of roughness of a steel plate cut by the laser beam having a wavelength in the 1 µm band by way of observation experiment. As a result thereof, the inventors of the present invention have made it clear that the cause for generation of roughness is that a flow of molten steel that flows down a side part of a kerf front becomes discontinuous.

Figure 25A:
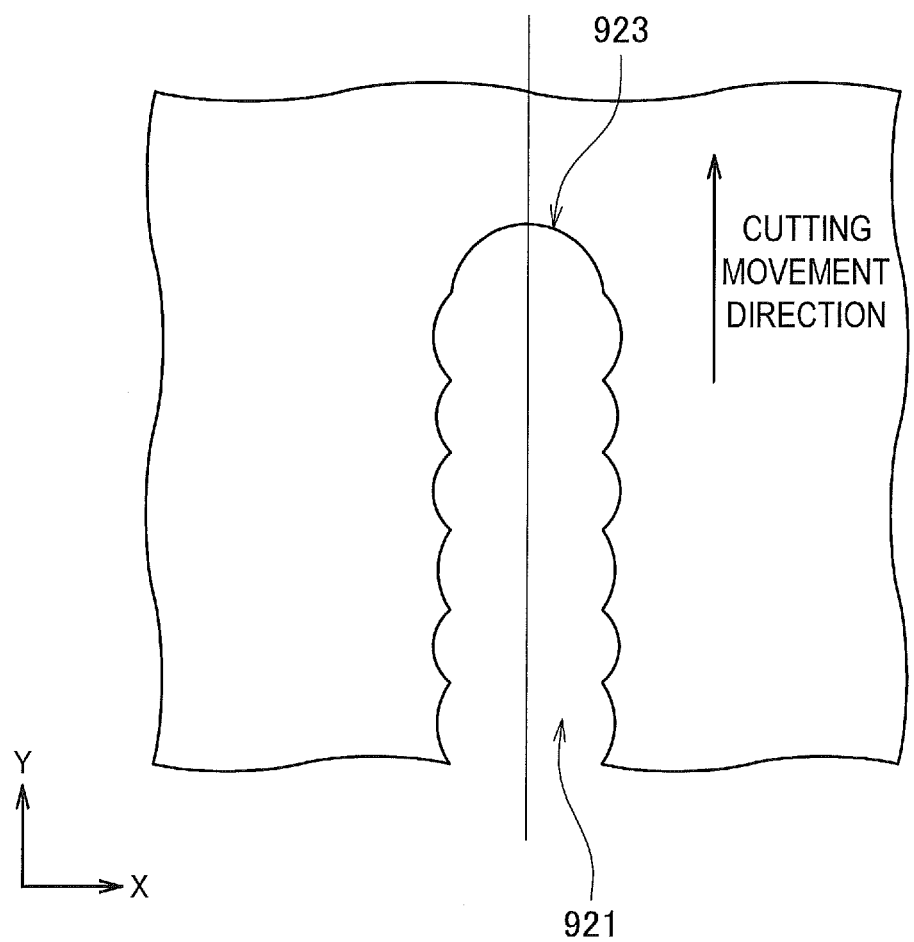
FIG. 25A is an explanatory diagram illustrating a kerf at a time of steel plate cutting.
Figure 25B:
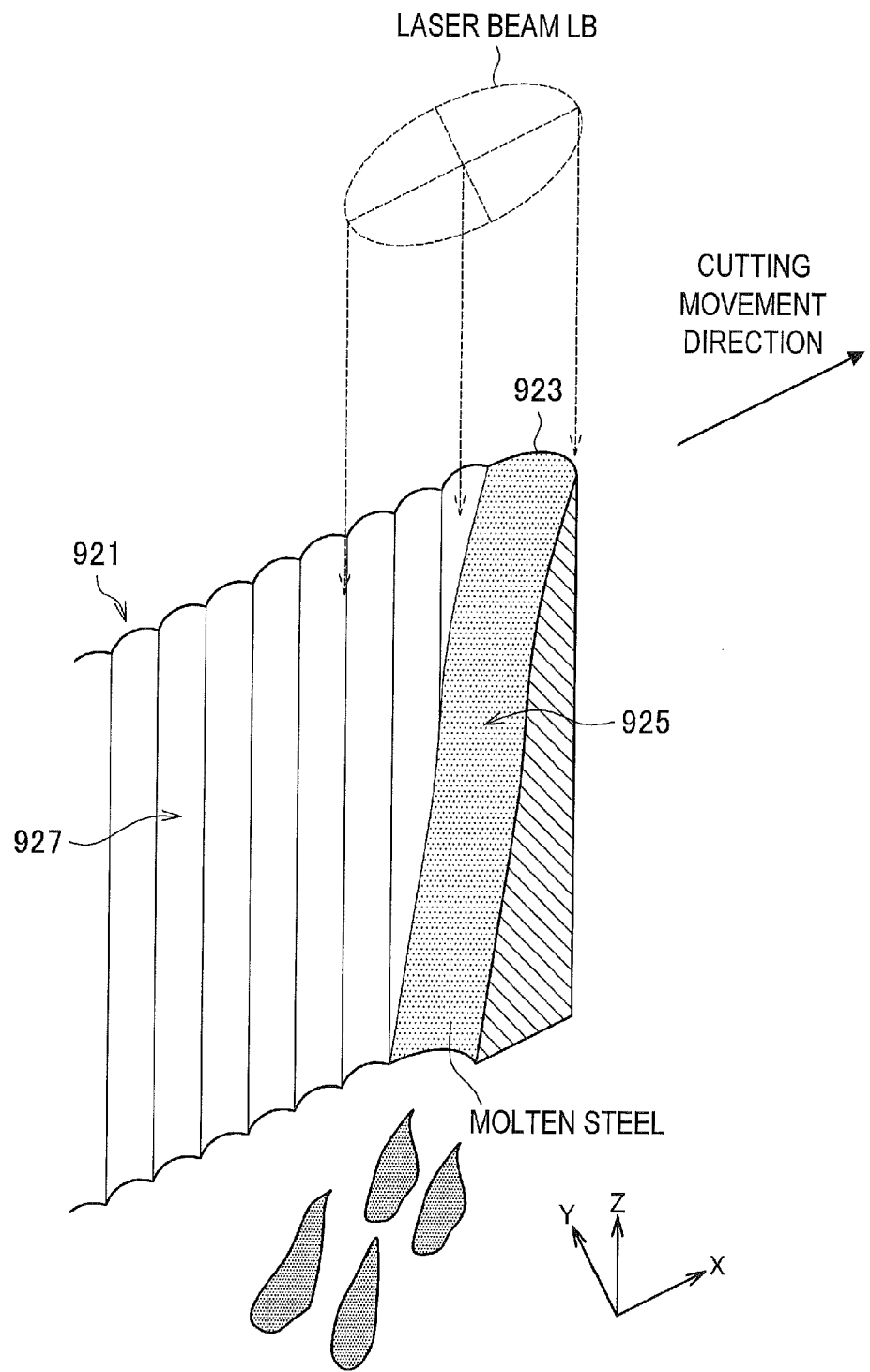
FIG. 25B is an explanatory diagram illustrating the kerf at the time of steel plate cutting.

As shown in FIG. 25B, the flow of molten steel on the kerf front is conventionally believed to be continuous. However, as shown in FIG. 1, as a result of the observation experiment carried out by the inventors of the present invention, it has become clear that actually, the molten steel slides down a side part 15 of a kerf front 11 discontinuously in a form of a liquid drop.

In more detail, the steel plate that has absorbed the laser beam LB is heated and melted by energy of the laser beam LB and is turned into a liquid drop. The liquid drop is removed by assist gas to the lower part, thereby forming a kerf front surface 13. With the translation of the laser beam LB, a flow of the molten steel that slides down the kerf front surface 13 occurs, the steel plate is cut, and a kerf 10 is formed.

On the other hand, also on the side part 15 of the kerf front corresponding to an outer edge part of the laser beam LB, a steel material absorbs the laser beam LB, the steel material melts on the surface of the steel plate at the Z-axis positive direction side, and is turned into a liquid drop. In this process, heat is conducted from the liquid drop to a solid part at or near a side of the kerf, and as a result thereof, the solid part is melted. Such a phenomenon is repeated while the liquid drop slides down the side part 15 of the kerf front, and on the side part 15 of the kerf front, a striation that is a groove 17, a part through which the liquid drop has passed, is formed periodically. It has been made clear that the striation becomes cut surface roughness.

Figure 2:
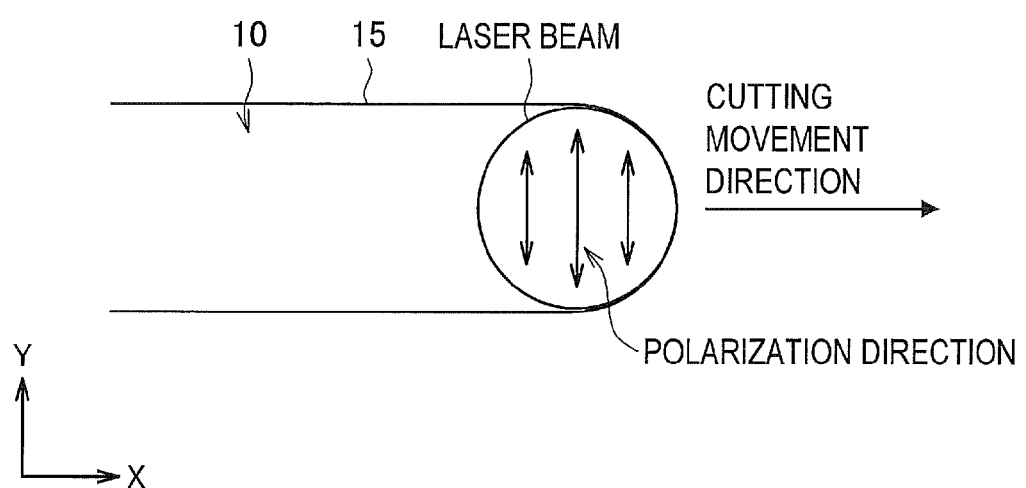
FIG. 2 is an explanatory diagram illustrating a polarization direction of a laser beam.

The inventors of the present invention have conducted intensive studies on the basis of the mechanism for generation of roughness. As a result thereof, they have focused on control of a polarization state of a focused laser beam and have found that, as schematically shown in FIG. 2, quality of a cut surface can be improved by irradiating the side part 15 of the kerf front with a laser beam having a polarization direction perpendicular to the side part 15 of the kerf front (in other words, irradiating the side part 15 with a laser beam of p-polarization). The following can be considered as a reason therefor. That is, by selecting the laser beam having the polarization direction perpendicular to the side part 15, the absorptance of the laser beam to the side part 15 is enhanced and the temperature of the liquid drop that flows down rises, but at the same time, since the viscosity of the liquid drop decreases, the speed that the liquid drop flows down increases so that the liquid drop slides down the side part 15 in shorter time. As a result thereof, it is considered that an amount of heat transferred to the solid part from the side part 15 decreases and the roughness is reduced.

Here, Patent Document 3 discloses a method in which linearly polarized light is used for a main laser beam for generating a molten material or for a laser beam for ejection of the molten material. However, it should be noted in addition thereto that a purpose of using the linearly polarized light in Patent Document 3 is to smoothly eject the molten material, which is different from improving quality of a cut surface that is an object of the present invention, and that a preferable polarization direction is also different from the preferable polarization direction used in Patent Document 3.

It is well known that an absorptance of a laser beam depends on the wavelength of the laser beam. It is estimated that the reason that the quality obtained by the cutting using the laser emitting a laser beam having a wavelength in the 1 µm band is lower than the quality obtained by the cutting using the $CO_2$ laser emitting a laser beam having a wavelength of 10.6 µm in the method of the prior art may be caused by the difference in the phenomenon of the absorption of the laser beam into the kerf front.

As the simplest method of emitting polarized light having a polarization direction perpendicular to the side part 15, there is used as shown in FIG. 2, a single polarization for one laser beam. However, in this method, when it is necessary to perform cutting in any directions on the XY-plane, it is not possible to obtain at all times the polarized light having a polarization direction perpendicular to the side part 15. With regard to this problem, in order to obtain the polarized light having a polarization direction perpendicular to the side part in all directions of the XY-plane, the inventors of the present invention have found a method including placing in a ring shape linearly polarized laser beams emitted from multiple optical fibers and arranging the polarizations of the respective laser beams radially around the center of the ring, and thereby achieving the present invention to be described below.

First Embodiment

Overall Structure of Laser Processing Apparatus

Hereinafter, with reference to FIGS. 3 to 10, a laser processing apparatus and a laser processing method according to a first embodiment of the present invention will be described in detail.

Figure 3:
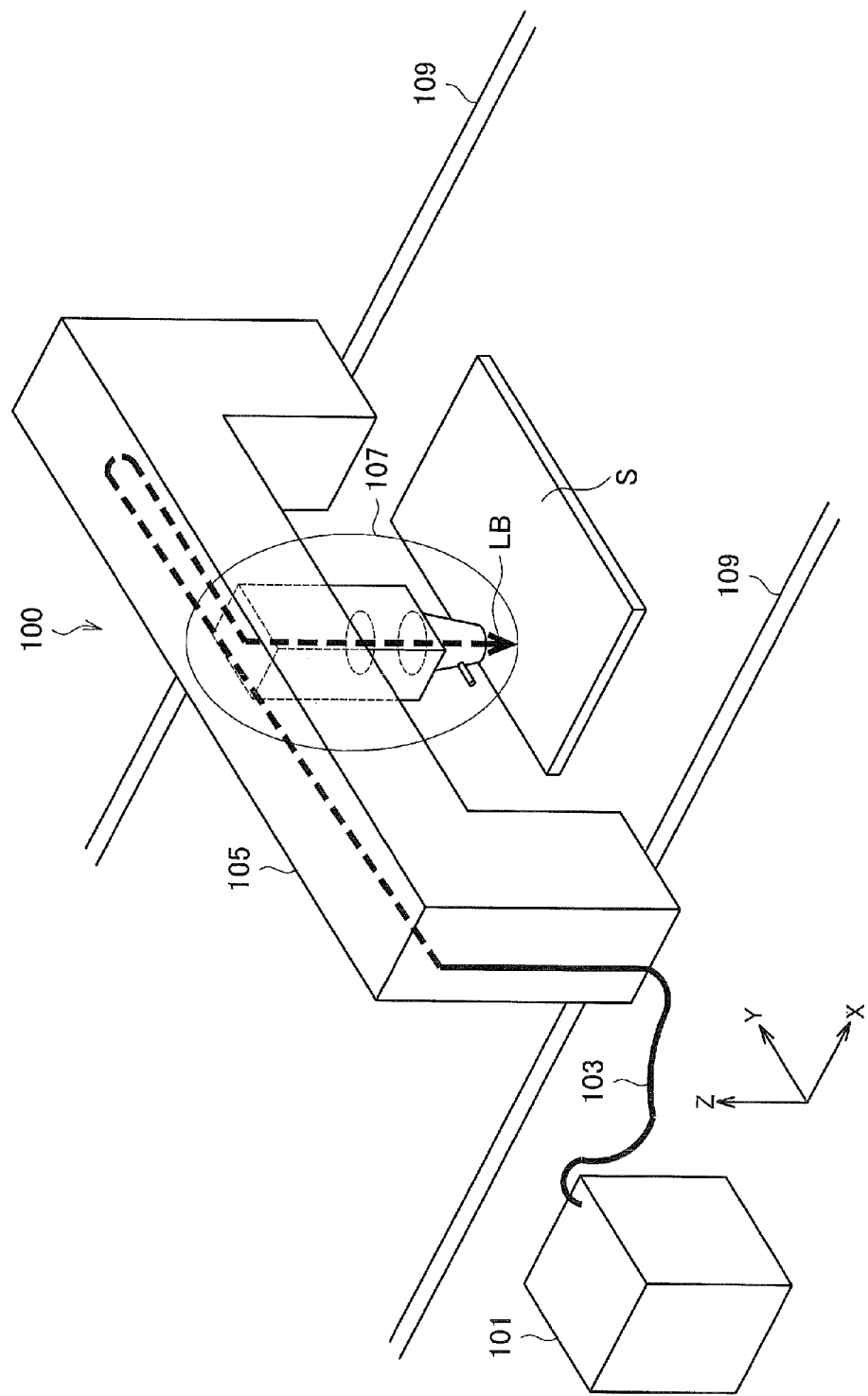
FIG. 3 is an explanatory diagram illustrating a laser processing apparatus according to a first embodiment of the present invention.

First, with reference to FIG. 3, an overall structure of a laser processing apparatus 100 according to the present embodiment will be described. FIG. 3 is an explanatory diagram showing an overall structure of the laser processing apparatus 100 according to the present embodiment.

As shown in FIG. 3, the laser processing apparatus 100 according to the present embodiment mainly includes a laser oscillator 101, an optical fiber 103, a laser processing apparatus body (hereinafter, simply referred to as "body") 105, a processing head 107, and a guide rail 109.

The laser oscillator 101 emits a laser beam LB having a wavelength in the 1 µm band (about 0.5 µm to 2 µm, or more preferably about 1 µm to 1.1 µm that responds to the wavelength of the laser beam of a typical laser such as a fiber laser or a disc laser) used for performing laser processing such as cutting on a workpiece (for example, steel plate S shown in FIG. 3). As will be described later, since the laser processing apparatus 100 according to the present embodiment transmits laser beams LB using multiple optical fibers 103, at least one laser oscillator 101 is installed in the laser processing apparatus 100. Further, the number of laser oscillators 101 to be installed may be equal to the number of optical fibers 103 to be used.

Any oscillator can be used as the laser oscillator 101 according to the present embodiment, as long as it is capable of emitting a laser beam having a wavelength of about 0.5 µm to 2 µm that is capable of being transmitted through an optical fiber. As the laser oscillator 101, a fiber laser, a disc laser, an Nd:YAG laser, or the like can be used. Further, in the laser processing apparatus 100 according to the present embodiment, the laser beam LB may have the wavelength in the 1 µm band before being guided into the optical fiber 103, and it is also possible to use a well-known harmonic of a laser oscillator as the laser beam LB. Note that the difference in the absorptance depending on the wavelength is small within the above-mentioned narrow wavelength band range, so that the mechanism for reducing the cut surface roughness as described above is common, and hence, it becomes possible to obtain effects according to the present embodiment in all wavelengths belonging to the above-mentioned wavelength band range.

Further, as will be described in detail with reference to FIG. 5, in the laser processing apparatus 100 according to the present embodiment, multiple optical fibers 103 are bundled into a ring shape, and spots of circular laser beams (hereinafter, also simply referred to as "beam spots") emitted from the respective optical fibers 103 are placed in a ring shape. As will be described in detail later, since images of those multiple circular beam spots are formed on the surface of the workpiece through a focusing optical system, the spots of circular laser beams are distributed in a ring shape also on the surface of the workpiece. In this case, it is preferred that a beam diameter defined by a circumscribed circle of the circular beam spots placed on a virtual ring which is at the outermost side on the surface of the workpiece be in a range desirable for laser cutting (for example, level of 0.1 mm to 1 mm) Accordingly, it is preferred that a diameter of a spot (spot diameter) of each of the circular laser beams focused on the surface of the workpiece be 0.3 mm or less. Here, the beam diameter defined by a circumscribed circle of the beam spots of a group of the laser beams represents a diameter of a circle that effectively acts in the laser cutting, and hereinafter, the beam diameter defined by a circumscribed circle of the beam spots of the laser beam group is referred to as effective diameter D. Note that the beam spots on the surface of the workpiece are not necessarily exactly circles. For example, the beam spot may be an oval, which is a shape in which a beam diameter in a radial direction around the center of the ring differs from a beam diameter in a direction perpendicular to the radial direction (that is, circumferential direction of the ring).

In order to obtain the above-mentioned spot diameter, it is preferred that beam quality (BPP) represented by a product ($r_0 \times \theta$) of a radius $r_0$ of a beam waist and a full width at half maximum $\theta$ of an angle of divergence of the beam be 15 mm·mrad or less. The value of the beam quality (BPP) becomes a fixed value in accordance with the laser oscillator 101 to be used, but on the other hand, for the transmission through an optical fiber, there are limitations on the value that the angle $\theta$ of divergence of the beam measured at the full width at half maximum can take. Accordingly, by reducing the value of the beam quality, a core diameter of the optical fiber through which the beam is transmitted can be reduced. This means that the spot diameter at the end part of the optical fiber can be reduced, and as a result thereof, as will be described in detail later, the spot diameter on the surface of the workpiece can also be reduced. In the present laser technology, it can be said that a preferred laser for the laser processing apparatus 100 according to the present embodiment is a fiber laser or a disc laser, which can realize the beam quality in the above range.

Note that the laser beam LB emitted from the laser oscillator 101 may be a continuous wave or a pulse wave.

The optical fiber 103 transmits the laser beam LB emitted from the laser oscillator 101 to the processing head 107 installed in the main body 105. As will be described in detail later, the laser processing apparatus 100 according to the present embodiment performs laser processing using a linearly polarized laser beam, and hence, a polarization maintaining fiber (PMF) is used for at least some of the optical fibers 103 (in more detail, the optical fiber(s) 103 connected to the processing head 107 to be described later) installed in the laser processing apparatus 100.

Note that a method of transmitting the linearly polarized laser beams LB using the multiple optical fibers 103 to the processing head 107, and a method of arranging the linearly polarized laser beams will be described again in detail later.

In the laser processing apparatus body 105, the processing head 107 which focuses the laser beams LB and irradiates the surface of the workpiece with the focused laser beams LB is installed. The apparatus body 105 can move freely along the guide rail 109 in the X-direction shown in FIG. 3.

The processing head 107 is installed so as to be capable of moving along the Y-direction shown in FIG. 3 with respect to the apparatus body 105. The processing head 107 focuses circular laser beams LB each having a linear polarization transmitted through the multiple optical fibers 103 and irradiates the surface of the workpiece with the focused circular laser beams LB. Further, the processing head 107 sprays assist gas such as inert gas of nitrogen gas, argon gas, or the like, or oxygen gas onto the surface of the workpiece, in the coaxial direction with the laser beams LB.

Note that the detailed structure of the processing head 107 will be described in detail below.

Heretofore, with reference to FIG. 3, an overall structure of the laser processing apparatus 100 according to the present embodiment has been described.

<Structure of Processing Head>

Subsequently, with reference to FIGS. 4 to 10, a detailed structure of the processing head 107 included in the laser processing apparatus 100 according to the present embodiment will be described. Also, detailed description will be made of a relationship among the laser oscillator 101, the optical fiber 103, and the processing head 107.

Note that, hereinafter, description will be made of a case as an example in which eight fiber lasers each capable of transmitting a linearly polarized laser beam are used as the laser oscillators 101, and laser beams LB are transmitted through the eight optical fibers 103 to the processing head 107. However, the form of the laser processing apparatus 100 to be described below is merely an example, and the structure of the laser processing apparatus 100 according to the present embodiment is not limited thereto.

Figure 4:
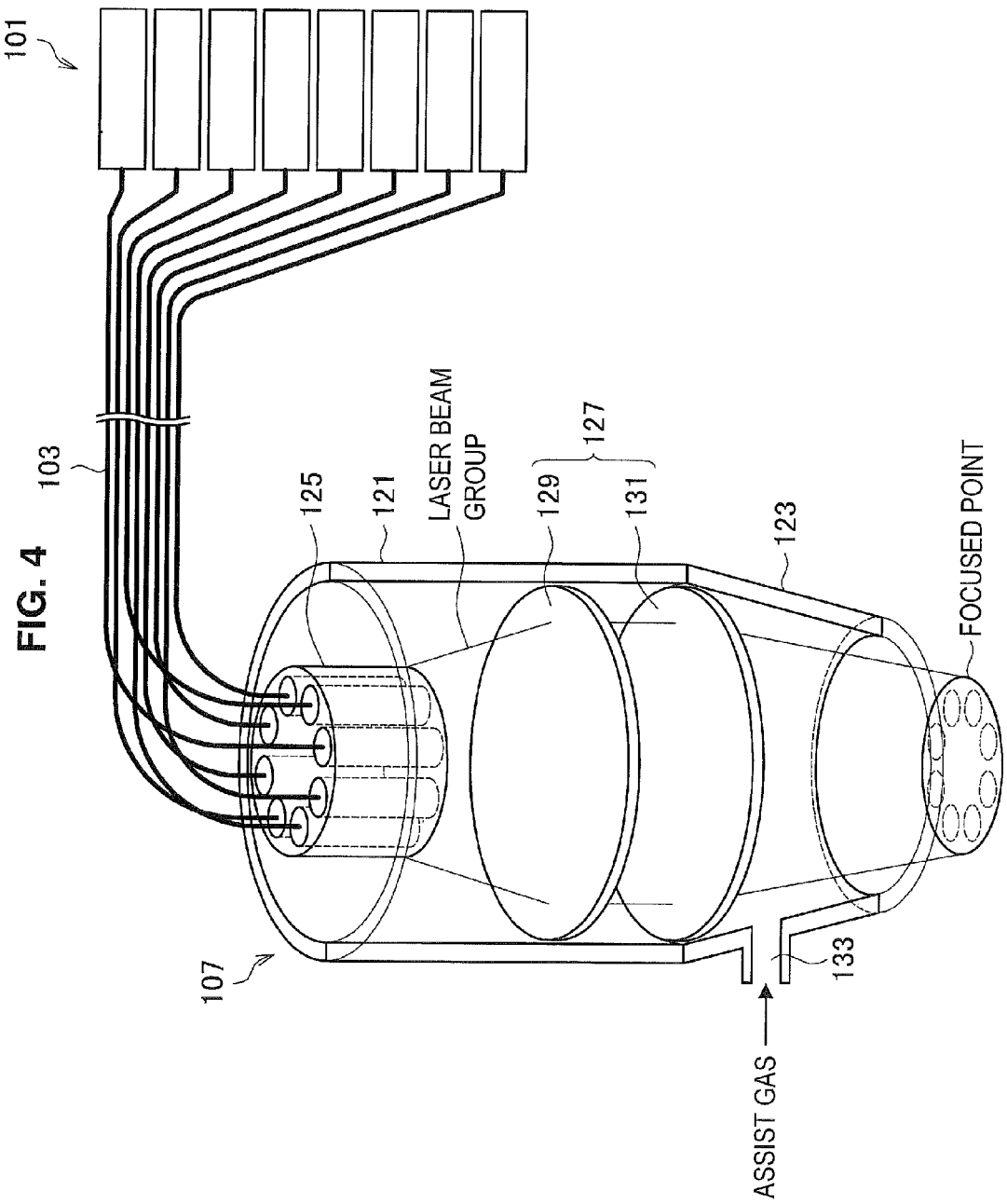
FIG. 4 is an explanatory diagram illustrating a processing head included in the laser processing apparatus according to the embodiment.
Figure 6:
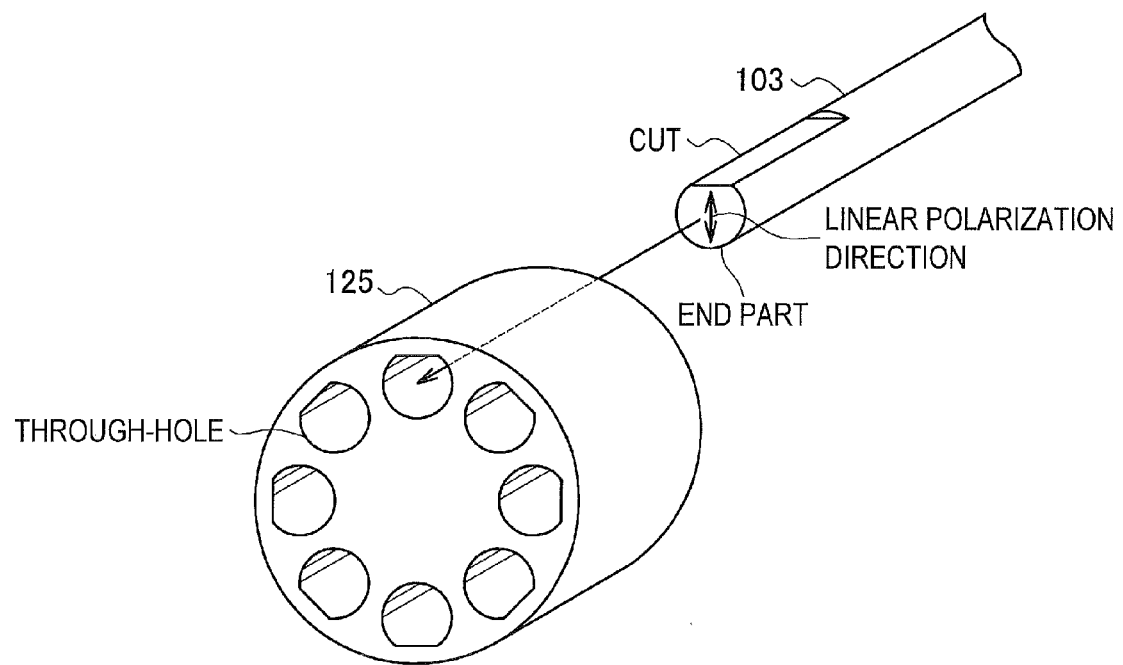
FIG. 6 is an explanatory diagram illustrating an example of a structure of an end part of an optical fiber, where the end part of the optical fiber is capable of easily arranging linear polarization directions of beam spots radially.
Figure 7:
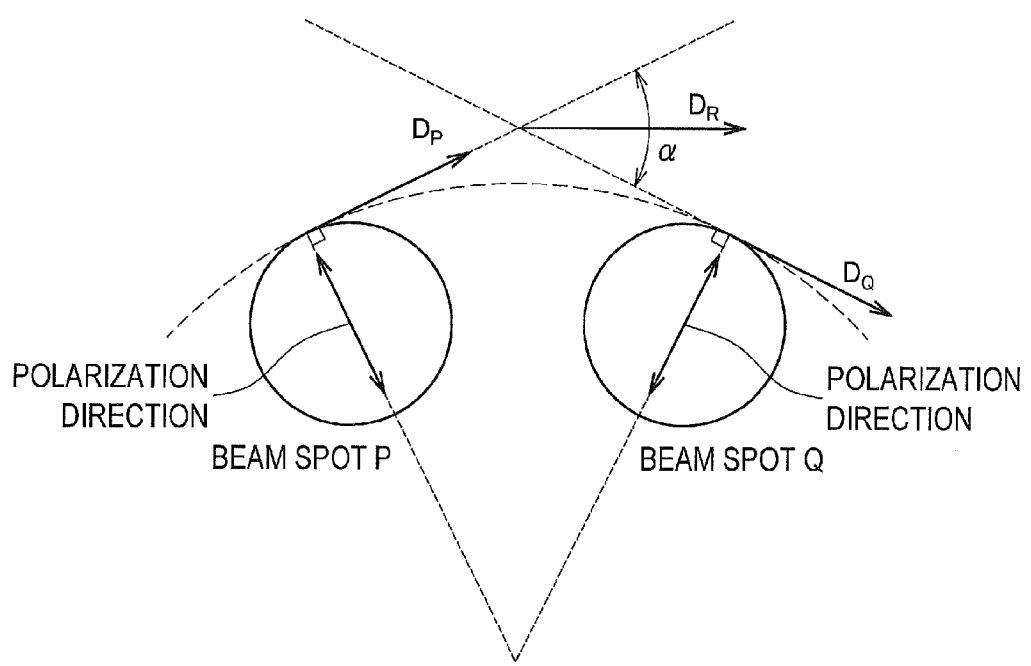
FIG. 7 is an explanatory diagram illustrating polarization directions of laser beams in the laser processing apparatus according to the first embodiment of the present invention.

Hereinafter, with reference to FIGS. 4 to 7, a structure of the processing head 107 according to the present embodiment will be described. FIG. 4 is an explanatory diagram showing a processing head according to the present embodiment, and FIG. 5 and FIG. 7 are each an explanatory diagram illustrating polarization directions of laser beams in the laser processing apparatus according to the present embodiment. FIG. 6 is an explanatory diagram showing an example of a structure of an end part of an optical fiber, where the end part of the optical fiber is capable of easily arranging linear polarization directions of beam spots radially.

As exemplified in FIG. 4, the processing head 107 according to the present embodiment is a component including a cylinder 121 and a nozzle 123, which is symmetric about a central axis.

On one base (base at the Z-axis positive direction side in FIG. 3) of the cylinder 121, multiple optical fibers 103 are fixed via an optical fiber fixing holder 125. Further, inside the processing nozzle 107, there is installed a focusing optical system 127 for focusing the laser beams LB serving as a laser beam group emitted from the respective optical fibers 103 fixed on the optical fiber fixing holder 125, and for irradiating the surface of the workpiece with the focused laser beams LB.

Further, to the nozzle 123 placed at a lower part (Z-axis negative direction side in FIG. 3) of the cylinder 121, an assist gas inlet port 133 is provided for supplying the nozzle 123 with assist gas. The assist gas such as oxygen gas, nitrogen gas, or argon gas, which is supplied from the assist gas inlet port 133, is sprayed downward through an opening provided at a lower portion of the nozzle 123 in the coaxial direction with the laser beam group. With the action of the assist gas, molten steel that is generated on a kerf front surface and a side part of a kerf front and that flows down to the lower part in the thickness direction of the steel plate is rapidly removed.

Through-holes are provided through the optical fiber fixing holder 125, the number of the through-holes corresponding to the number of optical fibers 103. The multiple optical fibers 103 are fixed to those through-holes, respectively. Here, the through-holes provided through the optical fiber fixing holder 125 are placed in one or multiple ring shapes. Further, in the case where the through-holes are placed in multiple ring shapes, the rings are placed concentrically so that they share a common center. Further, it is preferred that the respective through-holes on the circumference of a ring be placed at equal intervals so that through-holes adjacent to each other do not come into contact.

In the example shown in FIG. 4, eight optical fibers 103 are used for transmitting the laser beams LB emitted from the respective eight fiber lasers. Accordingly, within the optical fiber fixing holder 125, the eight through-holes are provided so as to be placed on a ring and placed at equal intervals.

Into the through-holes provided through the optical fiber fixing holder 125, the end parts of the optical fibers 103 opposite to the laser oscillator 101 side-ends are inserted and fixed, respectively. Here, in the processing head 107 according to the present embodiment, a linearly polarized laser beam is transmitted through the optical fiber 103 fixed to the optical fiber fixing holder 125. As shown in FIG. 5, as for the through-holes on at least an outermost ring, the polarization directions of the linearly polarized laser beams, which are transmitted through the respective optical fibers 103 fixed to the through-holes, are arranged radially around the center of the virtual ring on which the through-holes on the outermost ring are placed. In other words, as shown in FIG. 5, as for the through-holes on at least the outermost ring, the linear polarization directions corresponding to the respective through-holes are varied in an identical rotation direction (that is, clockwise direction or anticlockwise direction) around the center of the ring, between linearly polarized laser beams which are transmitted through optical fibers adjacent to each other. In order to realize the above-mentioned polarization state of the multiple laser beams as a whole, the optical fibers 103 are fixed to the respective through-holes of the optical fiber fixing holder 125 after adjusting the setting directions of the optical fibers 103 in a manner that the polarization directions of the linearly polarized light beams transmitted through the optical fibers 103 are set to the directions as shown in FIG. 5.

FIG. 6 shows an example of a structure of one of end parts of optical fibers, the end parts of optical fibers being capable of easily performing positioning for obtaining linearly polarized light beams that are arranged radially. As shown in FIG. 6, at the end part of an optical fiber, a cut is formed which has a plane that is perpendicular to the polarization direction of the linearly polarized light, for example. The optical fiber fixing holder 125 is also machined to have through-holes each having the same shape as the cut, and hence, the linear polarization directions of beam spots placed in a ring shape can be easily arranged radially. Note that, in FIG. 6, the description has been made of the case where the cut is formed at the end part of the optical fiber so as to be perpendicular to the linear polarization direction, but a relative direction of the cut with respect to the linear polarization direction is not particularly limited as long as it is usable as a mark for the positioning of the optical fiber 103 and the optical fiber fixing holder 125.

Further, in order to support uniformity of the processing in processing a workpiece along any direction, it is preferred that the powers of laser beams emitted from the respective optical fibers 103 be adjusted to be equal.

Note that it is preferred that a silica glass fiber without core be fusion-bonded as an end cap to the end part of the optical fiber 103 fixed to the optical fiber fixing holder 125, for example. With the end cap being fusion-bonded, a power density of a laser beam at a glass end surface from which the laser beam is emitted from the optical fiber into the air is decreased, and hence, it becomes possible to prevent the glass end surface from being damaged. Note that the end cap may be fusion-bonded to the output end of each of the optical fibers 103, or one single end cap may be provided to the optical fibers fixed to the optical fiber fixing holder 125.

The laser beam group including laser beams LB emitted from the respective output ends of the optical fibers 103 fixed to the optical fiber fixing holder 125 is focused by the focusing optical system 127, and the surface of the workpiece is irradiated with the focused laser beam group. That is, the focusing optical system 127 installed in the processing head 107 has a function of forming an image of intensity distribution (pattern) of laser beams at the end parts of the optical fibers 103 on the surface of the workpiece. Accordingly, in the case where the laser beam group emitted into the air from the base of the optical fiber fixing holder 125 has the intensity distribution in which circular beam spots are disposed on a ring at equal intervals as shown in FIG. 5, the intensity distribution of the laser beam group on the surface of the workpiece is also the one in which, as shown in FIG. 5, the circular beam spots are placed in a ring shape and the respective linear polarization directions are arranged radially.

In the processing head 107 shown in FIG. 4, there are installed as examples of such a focusing optical system, a collimator lens 129 that changes a group of laser beams that diverge and are emitted from the optical fibers 103 into parallel light beams, and a focusing lens 131 that focuses the group of laser beams that are changed into the parallel light beams onto the surface of the workpiece. Note that, in the example shown in FIG. 4, the focusing optical system 127 includes two optical elements (lenses) of the collimator lens 129 and the focusing lens 131, but the focusing optical system 127 may have at least one optical element (lens), and the focusing optical system may also include a group of three or more lenses. Further, the collimator lens 129 and the focusing lens 131 may each have a group including multiple optical elements (lenses). Here, the lens to be used for the focusing optical system may be a spherical lens or an aspherical lens.

Figure 5:
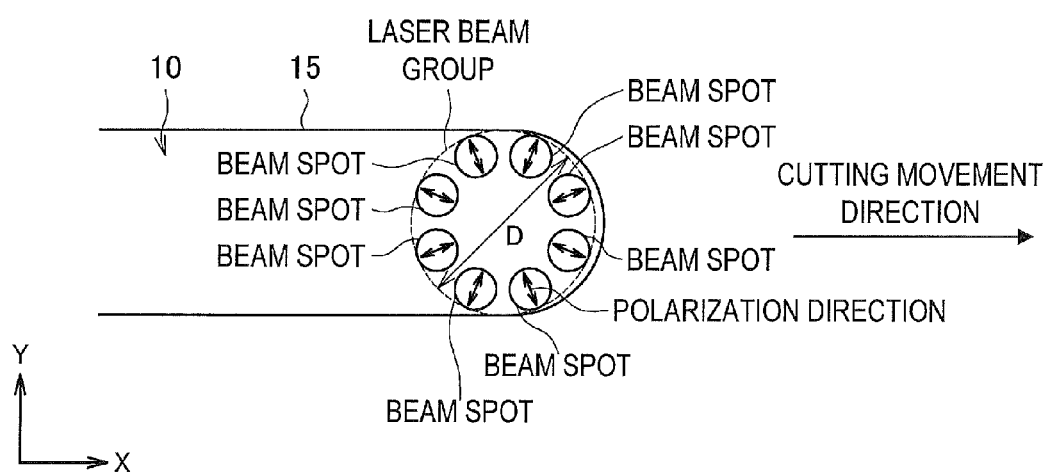
FIG. 5 is an explanatory diagram illustrating polarization directions of laser beams in the laser processing apparatus according to the embodiment.

In the present embodiment, as shown in FIG. 5, the effective diameter of the laser beam group is defined by the circumscribed circle of the beam spots placed on the outermost ring. The effective diameter D of the laser beam group on the surface of the workpiece is a value obtained by multiplying a diameter d of the circumscribed circle of the circular beam spots placed in a ring shape at the end parts of the optical fibers by an image formation magnification determined based on a focal length and an installation position of a focusing lens group used as the focusing optical system 127. As for each of the beam spots placed in a ring shape, a spot diameter on the surface of the workpiece is a value obtained by multiplying a spot diameter at the end part of the optical fiber given as a core diameter of the optical fiber by the image formation magnification.

It is preferred that a beam diameter (that is, the effective diameter of the laser beam group) D on the surface of the workpiece be about 0.1 to 1 mm, and in general, with increase in the thickness of the workpiece, a larger beam diameter is selected. Accordingly, in the present embodiment, the image formation magnification of the focusing optical system 127 is selected so as to obtain a desired beam diameter. As shown in FIG. 4, in the case where the collimator lens 129 and the focusing lens 131 are installed between the end parts (that is, a base of the optical fiber fixing holder 125) of the bundled optical fibers and the focus point on the surface of the workpiece, the effective diameter D of the laser beam group on the surface of the workpiece can be represented by the following Expression 1, where d represents a diameter of the circumscribed circle of the circular beam spots placed in a ring shape at the base of the optical fiber fixing holder 125, $f_1$ represents a focal length of the collimator lens 129, and $f_2$ represents a focal length of the focusing lens 131.

$$D = \frac{f_2}{f_1} \times d \qquad \text{(Expression 1)}$$

As shown in FIG. 5, by allowing the circular beam spots disposed on at least the outermost ring among the circular beam spots arranged in one or multiple ring shapes to have radially arranged linear polarizations, laser beams each having a polarization direction approximately perpendicular to the side part 15 of the kerf front enter the side part 15, even in the case where any processing directions (cutting direction) has been selected. As a result thereof, compared with a laser beam in a usual non-polarization state, the absorptance of a laser beam to a liquid drop that flows down the side part 15 of the kerf front increases. Accordingly, the temperature of the liquid drop rises while the viscosity of the liquid drop decreases, and with the decrease in the viscosity, the drop velocity of the liquid drop increases. Therefore, an amount of heat transferred to the solid part from the side part decreases, and the roughness of the cut surface is reduced.

Note that the linear polarization directions shown in FIG. 5 may not be arranged completely radially, and the angle between a linear polarization direction of a circular beam spot with which the side part 15 is irradiated and a direction perpendicular to the side part 15 (that is, direction perpendicular to the cutting movement direction) may be 30 degrees or less. When the angle between the linear polarization direction and the direction perpendicular to the side part 15 is 30 degrees or less, the absorptance of the laser beam to a liquid drop that flows down the side part 15 increases by 50% or more compared with the case of irradiation with a laser beam in a non-polarization state, and hence, it becomes possible to achieve effects according to the present embodiment.

In considering processing (for example, cutting) in any direction, in order to keep the angle between the linear polarization direction of the circular beam spot with which the side part 15 is irradiated and the direction perpendicular to the cutting movement direction (direction of the normal of the side part 15) 30 degrees or less at all times, the angular difference between linear polarization directions of circular beam spots that are adjacent to each other may be 60 degrees or less. Hereinafter, with reference to FIG. 7, the reason therefor will be described.

FIG. 7 shows two beam spots P and Q, which are extracted from the multiple circular beam spots arranged in a ring shape on the outermost ring and are placed adjacent to each other, with the respective linear polarization directions.

Here, let us assume that the cutting is performed in a direction $D_P$ that is perpendicular to the linear polarization direction of the beam spot P. In this case, the linear polarization direction of the beam spot P with which the side part 15 is irradiated is completely perpendicular to the cutting movement direction, and it is a state which maximizes a cut surface roughness-reducing effect according to the present embodiment. In the same manner, also for the case of performing cutting in a direction $D_Q$ that is perpendicular to the linear polarization direction of the beam spot Q, the cut surface roughness-reducing effect according to the present embodiment is maximized.

Here, let us assume that the cutting direction is gradually changed from $D_P$ to $D_Q$. In this case, the linear polarization directions of the beam spots P and Q with which the side part 15 is to be irradiated differ the most from the direction perpendicular to the cutting movement direction when cutting in a direction (that is, direction $D_R$ in FIG. 7) of an angle obtained by dividing an angle between a vector $D_P$ and a vector $D_Q$ into two equal parts. The maximum deviation angle in this case is given as a value determined by dividing the angular difference between the linear polarization directions of the beam spots P and Q (angle α shown in FIG. 7) by 2. The following can be seen based on the above description: when the angular difference between the linear polarization directions of any adjacent two beam spots present on the ring is kept 60 degrees or less, in the cutting in any direction, the angle between the linear polarization direction of the circular beam spot with which the side part 15 is irradiated and the direction perpendicular to the cutting movement direction can be kept 30 degrees or less at all times, and hence, the cut surface roughness-reducing effect according to the present embodiment can be achieved. Further, considering the number of optical fibers for realizing the above state, it is seen that the number of optical fibers to be installed is preferably six or more, the six being a value obtained by diving 360 degrees by 60 degrees.

Modified Examples

As described above, in the laser processing apparatus 100 according to the present embodiment, the multiple circular beam spots are placed in one or multiple ring shapes, the linear polarization directions of the respective beam spots placed on the outermost ring are arranged radially, and the laser powers of the beam spots placed in a ring shape are equal. Here, the laser processing apparatus 100 according to the present embodiment can be realized in various other forms in addition to the form shown in FIGS. 3 to 7.

Figure 8:
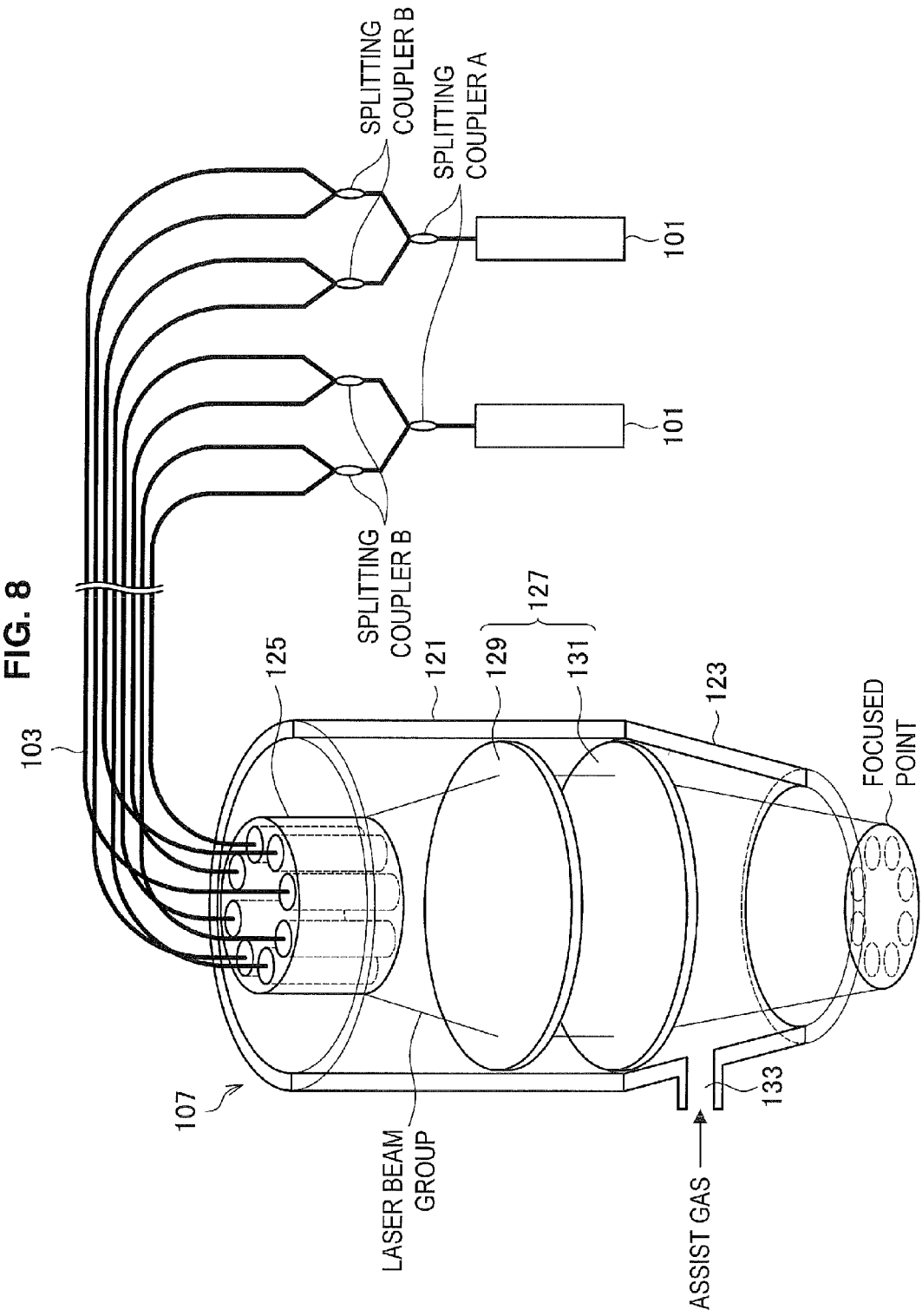
FIG. 8 is an explanatory diagram illustrating a processing head included in a laser processing apparatus according to the embodiment.

For example, FIG. 4 shows an example in which eight optical fibers 103 are bundled by the optical fiber fixing holder 125 and the eight optical fibers are connected to eight independent laser oscillators 101, respectively. However, as shown in FIG. 8, it is also possible to perform processing with smaller number of laser oscillators by splitting the optical fibers 103. Here, there are several modified examples for the apparatus structure shown in FIG. 8.

As one of the above-mentioned modified examples, there is given a structure in which a fiber laser that emits a linearly polarized laser beam is used, all optical fibers 103 installed at a downstream side of the fiber laser are polarization maintaining fibers, and both splitting couplers A and B shown in FIG. 8 are each a coupler capable of maintaining a plane of polarization. Further, as another one of the modified example, there is given a structure in which a fiber laser that emits a non-polarized laser beam is used, and an optical fiber for non-polarized light and a polarization maintaining fiber are used in combination. That is, the splitting couplers A shown in FIG. 8 are each a 1:1 splitting coupler for non-polarized light, and, from the fiber laser to each of the splitting couplers B shown in FIG. 8, a non-polarized laser beam is transmitted using a usual optical fiber for non-polarized light. After that, a coupler for splitting the non-polarized beam into two linearly polarized light beams having equal powers is used as each of the splitting couplers, and fibers at downstream of the splitting couplers B each transmit a linearly polarized laser beam to the optical fiber fixing holder 125 using the polarization maintaining fiber.

It should be noted that, in the cutting using laser beams, as a first order approximation, a required laser power is determined based on a volume of material per unit time to be melted and removed as a kerf. Accordingly, in the case of selecting a single cutting speed, it is necessary that with increase in the thickness of the material to be cut, the laser power to be emitted is increased. However, as generally known with commercially available fiber lasers and the like, the quality of a laser beam emitted from the laser oscillator deteriorates with increase in the power of the laser beam, and hence, there is a tendency that a problem occurs that a focal depth cannot get large at or near the focus point. Based on such a background, in the laser processing apparatus and the laser processing method according to the present embodiment using multiple laser beams, for increasing total power to be emitted in order to cut a thicker material, there is considered a way in which the total power to be emitted is increased while maintaining the beam quality as a whole by using many laser beams whose power is small but whose quality is satisfactory.

Figure 9:
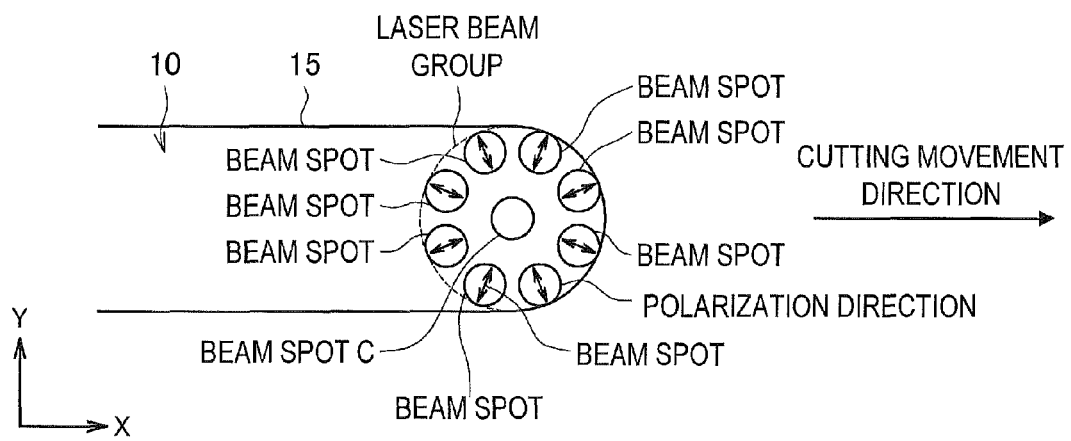
FIG. 9 is an explanatory diagram illustrating polarization directions of laser beams in the laser processing apparatus according to the embodiment.

As the modified example described above in which the number of laser beams is increased, as shown in FIG. 9, a beam spot C may further be disposed at the center of the ring in addition to the beam spots which are arranged in a ring shape. The beam spot C placed at the center of the ring is hardly absorbed into the side part 15 of the kerf front, and is entirely contributed to melting and removing of the approximately central part in the thickness direction of the steel plate of the kerf front surface. Accordingly, the polarization state of the beam spot C placed at the center of the ring may be any, and any of the non-polarized light and the linearly polarized light having a predetermined polarization direction may be used. However, in the case where uniformity is being demanded in the finished quality when the cutting is performed in any directions, it is preferred that the laser beams have a characteristic that the laser beams are symmetric about a central axis as a whole. In order to allow the laser beams to have a characteristic that the laser beams are symmetric about a central axis, it is preferred that laser beams in non-polarization states be disposed at the central part of the ring, or laser beams in circular polarization states may also be disposed. In this way, the beam spot C is additionally disposed at the center of the beam spot group arranged in a ring shape, and hence, it becomes possible to increase the cutting speed and to cut a workpiece having a larger thickness.

Figure 10:
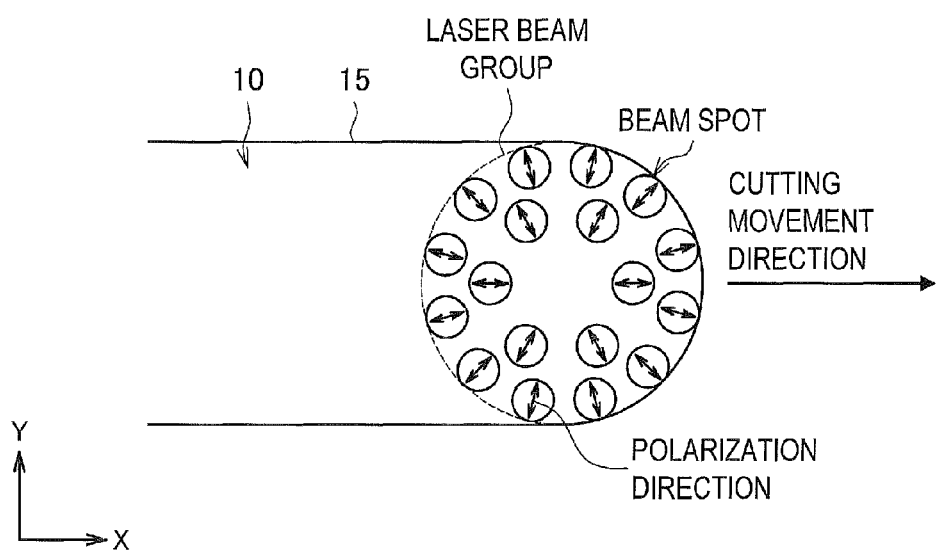
FIG. 10 is an explanatory diagram illustrating polarization directions of laser beams in the laser processing apparatus according to the embodiment.

Further, as another modified example in which the number of laser beams is increased, as shown in FIG. 10, circular beam spots may be disposed in multiple ring shapes each having a common center. In this case, it is preferred that the circular beam spots forming the multiple rings be disposed so as to be symmetric about a central axis. Further, the beam diameter defined by the circumscribed circle of the circular beam spots placed on the outermost ring can be made smaller, when the multiple circular beam spots are disposed in an alternating configuration in which, between two adjacent circular beam spots on a single ring, a circular beam spot placed on a ring adjacent to the aforementioned ring is placed.

Here, the circular beam spots disposed on the outermost ring each have a linear polarization, and, as exemplified in FIG. 5, the linear polarization directions are arranged radially around the center of the ring. Further, as shown in FIG. 10, the circular beam spots disposed on the ring placed inside the outermost ring may have linear polarizations arranged radially around the center of the ring, or may be in non-polarization states. In general, when cutting at a low speed, the side of the kerf tends to be irradiated with mainly only the beams on the outermost ring, but as the cutting speed increases, the side of the kerf is also irradiated with the inner beams, so that the larger proportion of the inner beams contributes to the cutting processing. Therefore, as shown in FIG. 10, if beam spots disposed at an inside of the outermost ring are made to have linear polarizations arranged radially around the center of the ring, it becomes possible to make the side part of the kerf front to efficiently absorb energy of laser beams particularly when cutting a workpiece having a predetermined thickness at a speed near the higher limit of the apparatus ability.

With the form shown in FIG. 10, the total laser power to be emitted can be increased dramatically, and a focused beam diameter defined by the circumscribed circle of the beams arranged on the outermost circle can be increased. In this way, the width of the formed kerf is increased, so that the molten material can be removed more easily. In this way, it becomes also possible to cut a workpiece having a large thickness while reducing the cut surface roughness.

Note that, the circular beam spots may be disposed on multiple rings each having a common center as shown in FIG. 10, and then the circular beam spot C may additionally be disposed at the center part of the rings as shown in FIG. 9.

Figure 11:
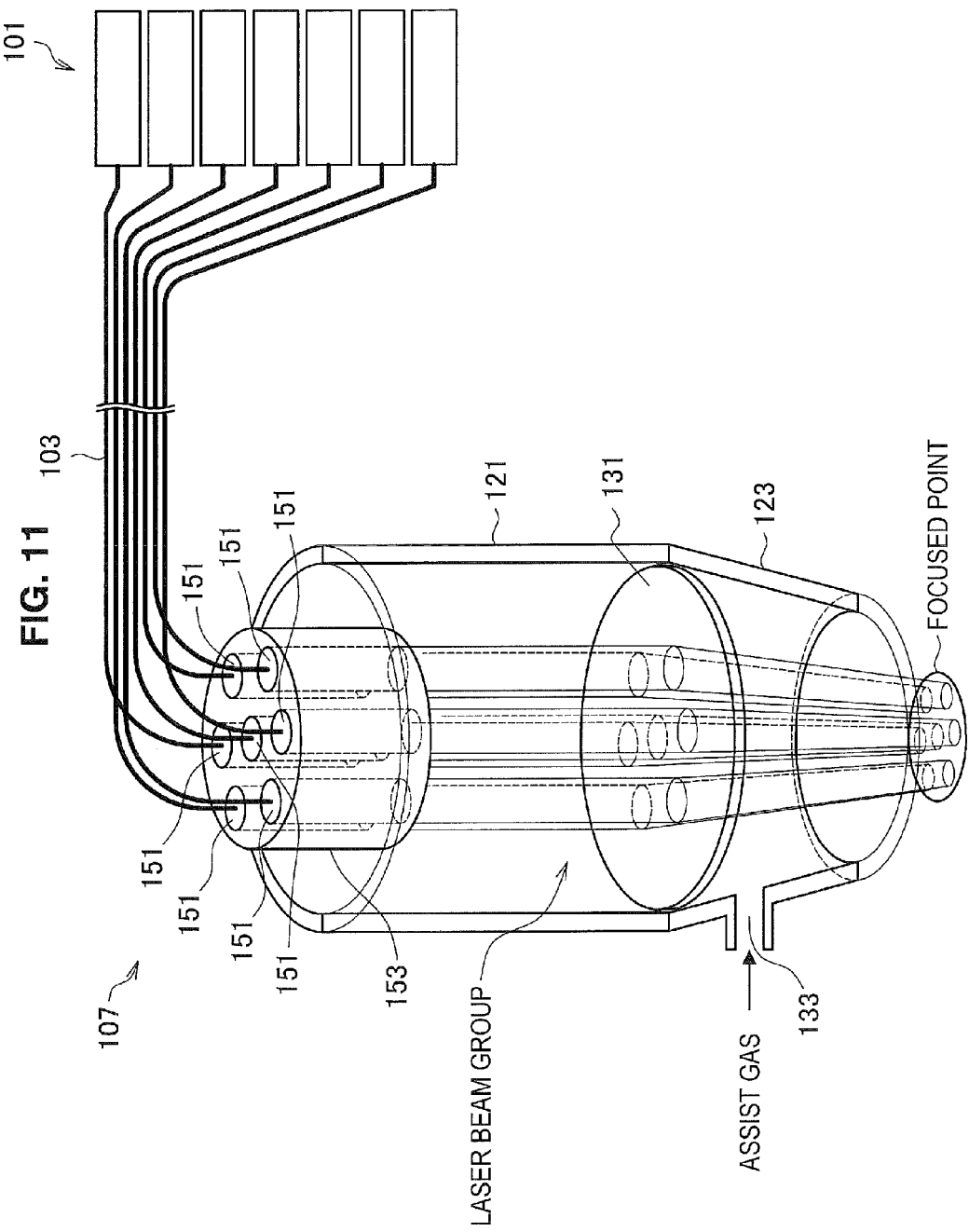
FIG. 11 is an explanatory diagram illustrating a modified example of the laser processing apparatus according to the embodiment.

Further, in FIG. 11, another modified example of the laser processing apparatus according to the present embodiment is shown.

In this modified example, seven laser beams are transmitted to a processing head through seven independent optical fibers that are connected to seven laser oscillators 101, respectively. Further, in the present modified example, instead of the optical fiber fixing holder 125 shown in FIG. 4, there is used a collimator fixing holder 153 formed by bundling seven independent collimators 151. Seven laser beams emitted from outlets of the seven optical fibers are changed into parallel light beams, respectively, by the seven independent collimators 151 that are installed in the collimator fixing holder 153. Those collimators 151 each include a collimator lens, and have a function of changing the laser beams each having a certain angle of divergence emitted from the optical fibers into parallel laser beams using the collimator lenses.

Here, in the collimator fixing holder 153 shown in FIG. 11, six collimators 151 are placed on a single ring, and one collimator 151 that is remained is placed at the center of the ring. To the six collimators 151 arranged in a ring shape, linearly polarized laser beams are transmitted through six polarization maintaining optical fibers from six laser oscillators 101 which emit linearly polarized laser beams. Further, to the one optical fiber placed at the center of the ring, a non-polarized laser beam is transmitted from one laser oscillator 101 which emits a non-polarized laser beam.

Figure 12:
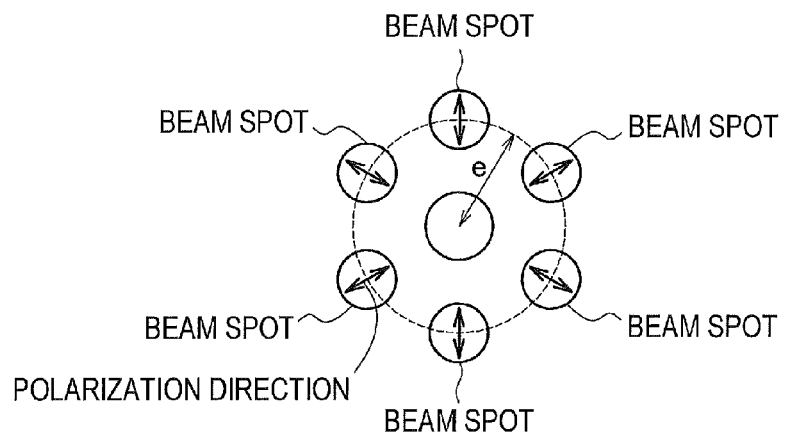
FIG. 12 is an explanatory diagram illustrating a modified example of the laser processing apparatus according to the embodiment.

The seven laser beams in total emitted from the respective collimators 151 enter a focusing lens 131, and are focused onto a processing point. With the use of a method described below, as shown in FIG. 12, the laser beams can be focused in a manner that the laser beams emitted from the six collimators 151 arranged in a ring shape are placed on a ring, and a non-polarized laser beam is placed at the center of the ring. In this case, by adjusting linear polarization directions of the six laser beams placed on the ring, linear polarization directions of the six optical fibers at the focus point can be arranged radially with respect to the center.

The structure shown in FIG. 11 and FIG. 12 basically uses the collimators 151 the number of which is the same as the number of laser beams. For example, compared with the method of collecting and holding end parts of multiple optical fibers into an extremely narrow area of about less than 1 mm as the method shown in FIG. 4, the present modified example has an advantage that the manufacture thereof is easy.

Here, in an embodiment of the present invention, it is desirable that, as shown in FIG. 12, multiple laser beams be placed in a ring shape having a certain radius e and the diameters of those multiple laser beams be each equal to a desired beam diameter (for example, a minimum beam diameter obtained at a focus position). Hereinafter, there will be described various methods for allowing multiple parallel laser beams to enter one focusing lens as described above and allowing the focused beams to be placed in a ring shape as shown in FIG. 12.

Figure 13:
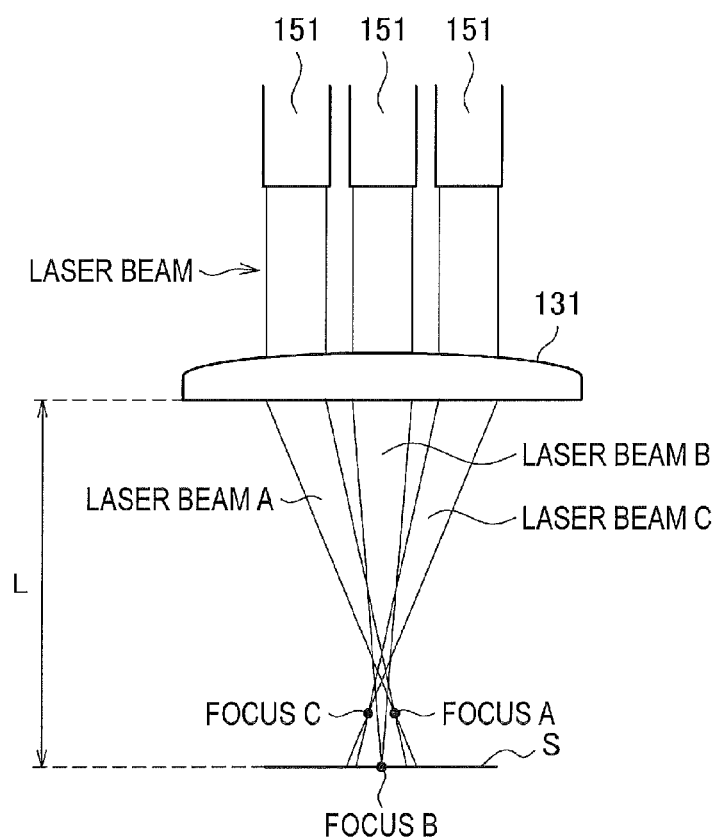
FIG. 13 is an explanatory diagram illustrating a modified example of the laser processing apparatus according to the embodiment.

First, let us assume that a usual spherical lens is used as the focusing lens 131. Assuming that the spherical lens to be used is ideally a lens completely free from aberration, the focus positions of the parallelly entered laser beams overlap at one point (in other words, radius e is 0). However, as it is well known, a spherical lens has spherical aberration, and hence, with the influence of the spherical aberration, the focus points do not completely overlap as shown in FIG. 13. As a result thereof, multiple beams are in a state of being arranged in a ring shape having a certain radius e.

Note that, in this case, when a distance L between the focusing lens 131 and a cut target surface is set to a distance in which a laser beam (for example, a laser beam B in FIG. 13) placed at the center is the focus position and has a minimum beam diameter, with the influence of the spherical aberration, the laser beams placed in a ring shape (for example, laser beams A and C in FIG. 13) suffer from a slight shift of the focus position and the beam diameter increases. If the influence on the cutting performance and the quality caused by the laser beams placed in a ring shape being shifted from the focus position is within a permissible level, effects of the present invention can be received with the arrangement shown in FIG. 11 and FIG. 12.

Here, the distance L between the focusing lens 131 and the cut target surface is not necessarily set in a manner that the laser beam placed at the center is in the focus position, and the distance L may be increased or decreased. It is also possible to adjust the interval between the central beam spot and each laser beam spot placed on the ring (that is, the size of the radius e in FIG. 12) by controlling the increase and decrease of the distance L.

Further, instead of using a usual spherical lens, when an aspherical lens having a predetermined curved surface is used as the focusing lens 131, it is possible to make all the laser beams including the laser beam at the center and the laser beams arranged in a ring shape meet at one focus position, and to control as desired the radius e of the ring, based on a design of the curved surface of the lens.

Here, also by causing angles of incidence of the parallel laser beams with respect to the focusing lens 131 to be changed slightly from the right angle, the laser beam focusing state as shown in FIG. 12 can be obtained.

Figure 14:
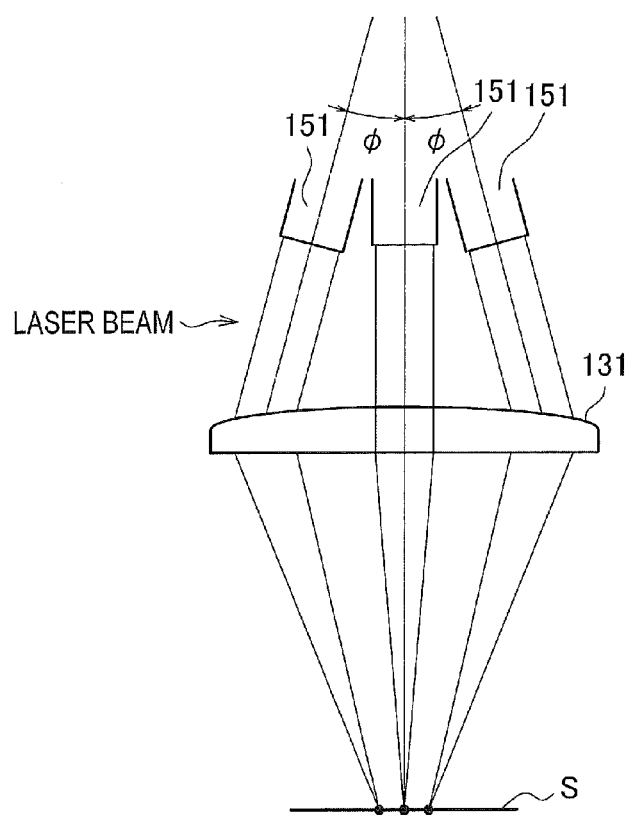
FIG. 14 is an explanatory diagram illustrating a modified example of the laser processing apparatus according to the embodiment.

First, as shown in FIG. 14, the collimators 151 placed in a ring shape are fixed in a manner that angles of the collimators 151 placed in a ring shape are set in a state of being tilted radially outward around the central axis direction of the ring of the collimator fixing holder 153, and thus, the radius e can be adjusted in accordance with a tilt angle of each collimator 151 (for example, angle φ in FIG. 14). In this case, a spherical lens, an aspherical lens, or the like can be used as the focusing lens 131.

Figure 15:
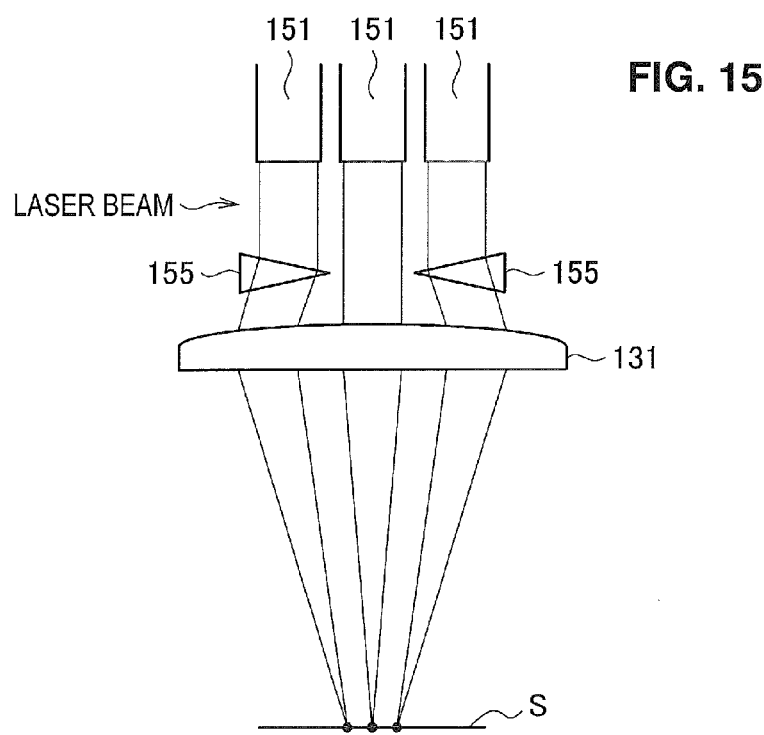
FIG. 15 is an explanatory diagram illustrating a modified example of the laser processing apparatus according to the embodiment.

Further, as shown in FIG. 15, a wedge 155, which tilts the laser beams emitted from the collimators 151 radially outward around the central axis direction of the ring of the collimator fixing holder 153, is placed on an optical path between a collimator 151 and the focusing lens 131, and thus, the angles of incidence of the parallel beams with respect to the focusing lens 131 can be changed slightly from the right angle, and the beam spots can be focused at a position away from the central axis at the processing point.

Note that, the angles of incidence of the parallel laser beams with respect to the focusing lens 131 is not necessarily angles tilted in a direction that departs from the central axis of the collimator fixing holder 153 (in other words, radially outward around the central axis direction of the ring of the collimator fixing holder 153) as shown in FIG. 14 and FIG. 15.

Figure 16:
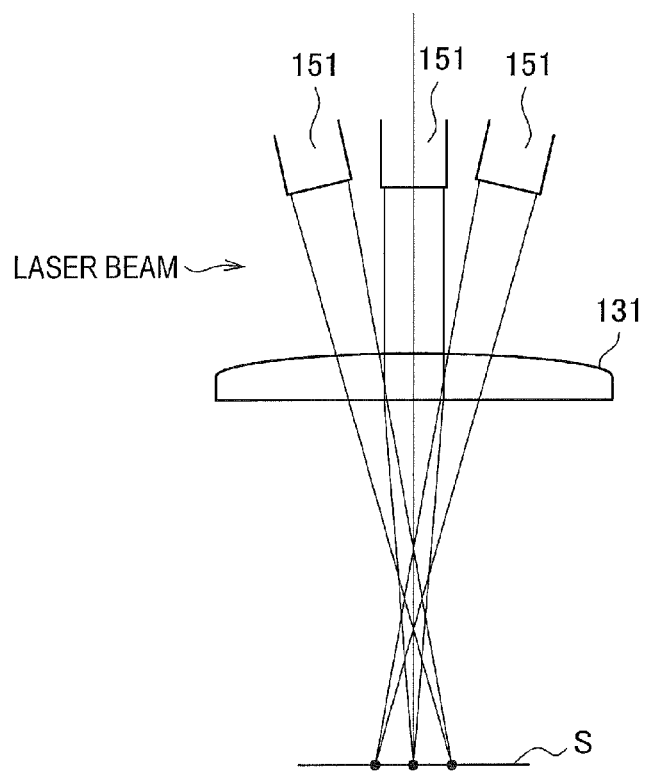
FIG. 16 is an explanatory diagram illustrating a modified example of the laser processing apparatus according to the embodiment.
Figure 17:
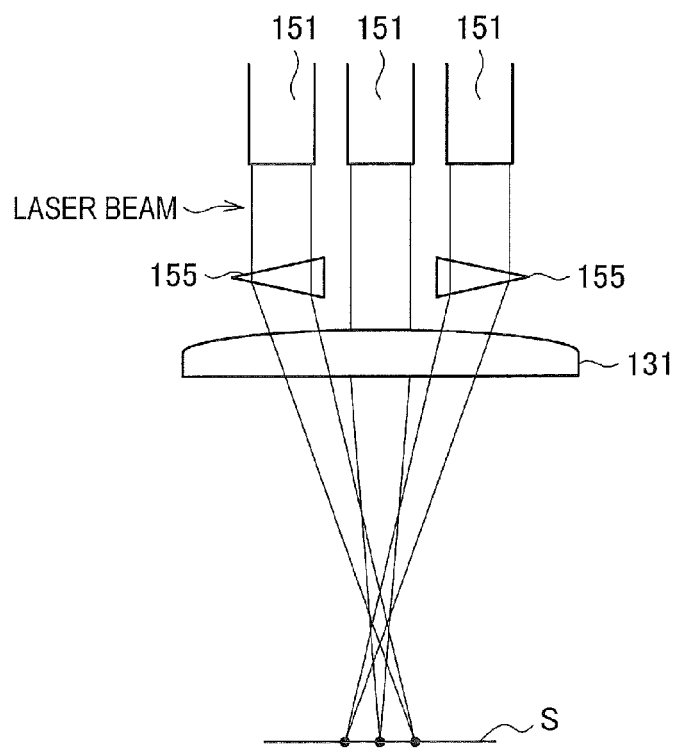
FIG. 17 is an explanatory diagram illustrating a modified example of the laser processing apparatus according to the embodiment.

For example, as shown in FIG. 16, multiple laser beams can be focused on a ring by tilting the collimators 151 in a direction that approaches the central axis of the collimator fixing holder 153 (in other words, radially inward around the central axis direction of the ring of the collimator fixing holder 153). As for the wedge 155, in the same manner, as shown in FIG. 17 for example, the wedge 155 may be placed so that the laser beams emitted from the collimators 151 are tilted radially inward around the central axis direction of the ring of the collimator fixing holder 153.

Here, it is needless to say that there are various ways of realizing modified examples of the present embodiment, including the combinations of the above methods.

Heretofore, in the modified examples of the present embodiment described using FIGS. 11 to 17, since a beam diameter of the multiple parallel laser beams emitted from the multiple collimators is about several millimeters, the distance between each of the central axes (optical axes) of the laser beams placed on a ring and the central axis of the ring is about 5 mm or more on the focusing lens 131. Accordingly, when the laser beams are focused onto the surface of the workpiece from the focusing lens 131, the optical axis of each of the laser beams arranged in the ring shape is slightly tilted with respect to the central axis of the ring.

On the other hand, in a first example of the present embodiment shown in FIG. 4 and FIG. 8, the distance between each of the optical axes of the laser beams placed in a ring shape and the central axis of the ring is about 1 mm or less on the focusing lens 131. This is because, in order to keep the effective diameter D of the laser beam group on the surface of the workpiece about 1 mm or less, which is preferable for the laser cutting, it is preferred that the diameter d also be about 1 mm or less, the diameter d having a relationship of Expression 101 with the effective diameter D and being a diameter of the circumscribed circle of the circular beam spots placed in a ring shape on the optical fiber fixing holder 125. Since the distance between the optical axis of each of the laser beams arranged in a ring shape and the central axis of the ring is small, the laser beams arranged on the ring are also transmitted in states that the optical axes thereof are practically parallel with respect to the central axis of the ring.

The substantial difference between the modified examples and the first example of the present embodiment is only in this point, and the essential part of the present invention is common among them, that the polarization directions of the multiple laser beams placed on a ring are arranged in radial directions. Therefore, also in the modified examples of the present embodiment, about the same degree of effects as the first example of the present embodiment can be achieved in regard to the cut surface roughness.

Note that, in the embodiment of the present invention described above, the powers of the laser beams emitted from the multiple optical fibers may not be the same. In order to obtain the same cut quality in performing cutting in any directions, it is desirable that powers of any two laser beams placed on the same ring be the same, but the powers of two laser beams placed on different rings may not be the same. Further, in the description above, the description has been made of the example in which the focus positions of one or multiple laser beams match the workpiece surface, but the focus positions may also be set inside the workpiece or above or below the workpiece.

Heretofore, with reference to FIGS. 1 to 17, the description has been made in detail of the laser processing apparatus and the laser processing method according to the present embodiment.

EXAMPLES

Next, with reference to FIGS. 18 to 23, an example of a laser processing apparatus and a laser processing method according to an embodiment of the present invention will be described in detail with Examples and Comparative Examples. Hereinafter, in order to confirm effects of the laser processing apparatus and the laser processing method according to an embodiment of the present invention, there will be specifically described results of experiments conducted using a trial laser processing apparatus that has been actually manufactured. Note that the following Examples are shown in order to specifically describe the laser processing apparatus and the laser processing method according to an embodiment of the present invention, and the laser processing apparatus and the laser processing method according to an embodiment of the present invention are not limited to the examples shown below.

Example 1

As shown in FIG. 4, a laser was manufactured by a method in which multiple laser beams emitted from a fiber laser which emits linearly polarized light were independently transmitted through polarization maintaining fibers, respectively, and the end parts thereof were bundled. Then, a laser processing apparatus was produced by providing thereto a focusing optical system including a collimator lens and a focusing lens, and a nozzle having an assist gas inlet port. Further, a two-dimensional translation stage (not shown) was disposed at a lower portion of the laser processing apparatus, a test piece was fixed to the two-dimensional translation stage, and the test piece was moved by driving the two-dimensional translation stage, to thereby perform cutting processing.

Figure 18:
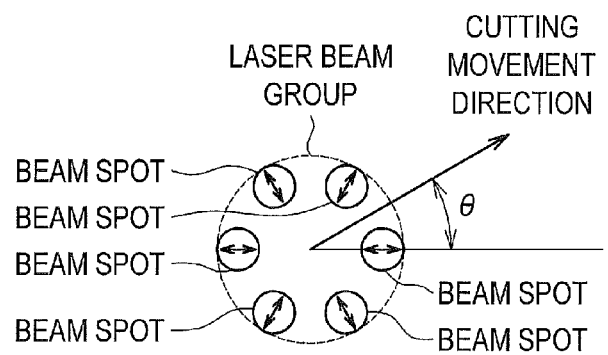
FIG. 18 is an explanatory diagram illustrating a processing head according to Example 1.

A pattern of laser beams on an optical fiber fixing holder was set in a manner that, as shown in FIG. 18, six circular beam spots were placed in a ring shape. The laser beams used in the laser processing apparatus were each a continuous wave laser beam, and all six laser beams had common characteristics. The used laser beams each had a beam quality (BPP) of 1.2 mm·mrad, and a maximum power of 400 W. Further, the core diameter of the optical fiber, that is, the diameter of a circular beam spot output from an end part of the optical fiber was 50 μm. With the use of the laser beams having those characteristics, the powers of the six beam spots were each set to 333 W. Here, the centers of the six circular beam spots were placed on the circumference of a circle having a diameter of 150 μm. Accordingly, in this Example, the diameter of the circumscribed circle of the six circular beam spots was 200 μm. One single end cap was provided to the six circular beam spots, and the six optical fibers were fusion-bonded to one end cap. The polarization directions were completely in a radial form, and a linear polarization direction of each of the optical fibers completely matched a direction of a line connecting the center of the circle and the center of the optical fiber.

The focal lengths of the collimator lens and the focusing lens used as the focusing optical system were both 200 mm. Accordingly, an image formation magnification of the focusing optical system in this Example was 1, a laser beam pattern at a focus position at which the optical fiber outlet just formed an image was exactly the same as a laser beam pattern on the optical fiber fixing holder, and an effective diameter of the laser beam group at the focus position at which the image of the optical fiber outlet was just formed was 200 μm. Note that, in this Example, the focus position was set to a position 2 mm below the surface of the test piece (that is, inside the test piece).

As the test piece, stainless steel SUS304 having a thickness of 5 mm was used. From a nozzle outlet having a diameter of 2.5 mm installed at a position 0.7 mm away from the surface of the workpiece, nitrogen gas having a pressure of 14 atm as assist gas was sprayed in the coaxial direction with the central axis of the laser beam.

With the use of a beam pattern in a basic shape of hexagon as shown in FIG. 18, in order to observe influence on cut surface roughness when cutting the test piece in various directions, experiments were carried out as shown in FIG. 18, by changing a cutting direction angle θ which was defined with respect to a reference direction of the beam pattern (direction connecting the center of a certain circular beam pattern and the center of the hexagon).

As Comparative Example, the same cutting as the above Example of the present invention was performed by focusing one non-polarized laser beam emitted from one fiber laser using completely identical focusing optical system. The spot diameter of the laser beam was a circle having a diameter of 200 μm, had a beam quality (BPP) of 1.2 mm·mrad, and had a beam power of 2000 W. The diameter (200 μm) and the total power (2000 W) were adjusted to the conditions of the above Example of the present invention.

The evaluation of the cut surface roughness was conducted by measuring ten-point average roughness $R_{zJIS}$ (JIS B 0601-2001) along the line of the central part (depth of 2.5 mm from the surface) in the thickness direction of the test piece, using a contact type roughness meter.

Figure 19:
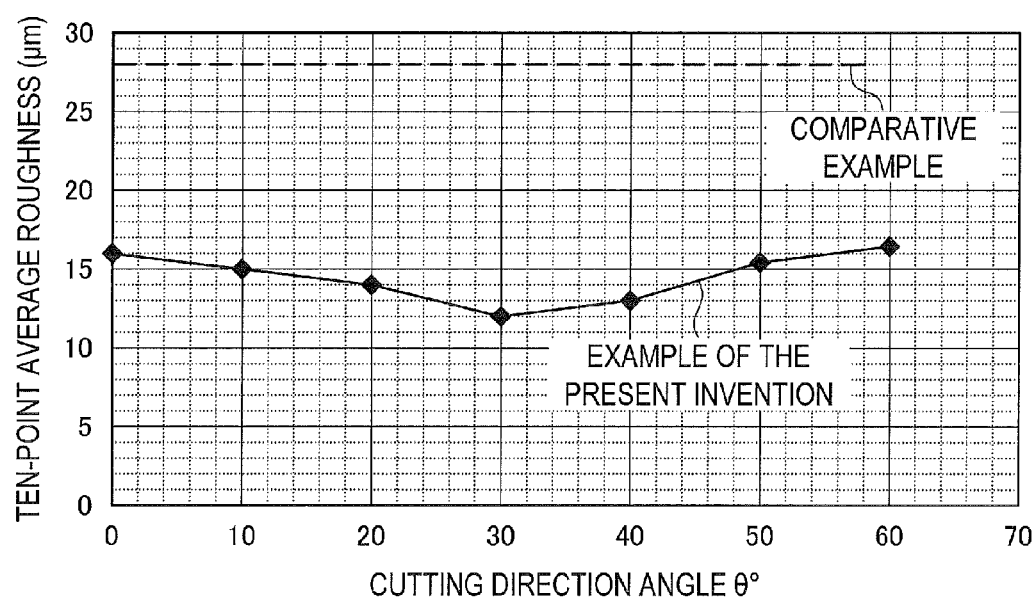
FIG. 19 is a graph showing measurement results of roughness of a side part of a kerf.

FIG. 19 shows measurement results of cut surface roughness in Example of the present invention and Comparative Example. The cutting speed was 2 m/min for all conditions. Since Comparative Example uses one laser beam and the focused beam pattern is originally isotropic, evaluation is conducted for cutting in only one direction. As it is clear from the comparison of measurement results of Example of the present invention and Comparative Example shown in FIG. 19, while the cut surface roughness of Comparative Example is about 28 μm, the cut surface roughness of Example of the present invention is about 12 μm to 16 μm, and hence, it is found that the cut surface roughness is suppressed in Example of the present invention compared to Comparative Example. Further, as it is clear from the results of Example of the present invention, although slight changes are seen in the cut surface roughness depending on the cutting direction angle θ, uniform cutting quality almost independent on the cutting direction angle θ could be obtained by using six beams.

Example 2

Figure 20:
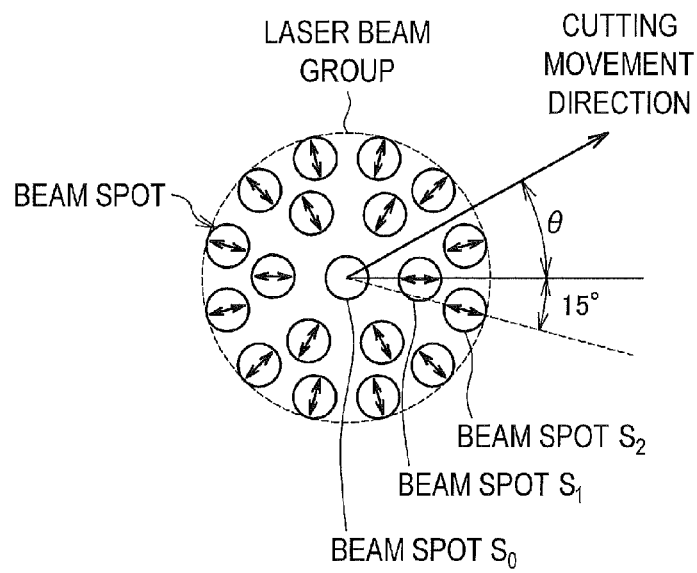
FIG. 20 is an explanatory diagram illustrating a processing head according to Example 2.

In order to confirm applicability to material having larger thickness, as shown in FIG. 20, a laser processing apparatus having a pattern formed of 19 circular beam spots was manufactured. Adopted as a method is that, except for one beam at a center part, multiple linearly polarized laser beams emitted from a fiber laser were independently transmitted through polarization maintaining fibers, respectively, and the end parts thereof were bundled by an optical fiber fixing holder. Further, as for the laser beam placed at the center part of the multiple rings, a laser beam emitted from a non-polarized fiber laser was transmitted through a usual polarization-independent optical fiber.

The core diameter of an optical fiber, that is, the diameter of a circular beam spot output from an end part of the optical fiber was 50 µm, which was the same for each of all 19 circular beam spots. The pattern of the laser beams on the optical fiber fixing holder includes, as shown in FIG. 20, an inner ring having six circular beam spots (the diameter of the circle passing through the centers of the beams was 150 mm), an outermost ring having 12 circular beam spots (the diameter of the circle passing through the centers of the beams was 280 mm), and one circular beam placed at the center (beam spot $S_0$ shown in FIG. 20). Accordingly, the diameter of the circumscribed circle of 19 circular beam spots placed on the outermost ring was 330 µm. Further, the angular difference of 15 degrees in the circumferential direction was set between a beam spot $S_1$, which is a reference for the beams placed on the inner ring, and a beam spot $S_2$, which is a reference for the beams placed on the outer ring, as shown in FIG. 20.

The laser beams used in the laser processing apparatus were each a continuous wave laser beam, and all 19 laser beams had common characteristics except for the characteristics on polarization. The used laser beams each had a beam quality of 1.2 mm·mrad, and a maximum power of 400 W. With the use of the laser beams having those characteristics, the powers of the 19 beams were each set to 400 W. One single end cap was provided to the 19 circular beam spots, and the 19 optical fibers were fusion-bonded to one end cap. The polarization directions of the 18 beams placed on the inner ring and the outer ring were completely in a radial form, and a linear polarization direction of each of the optical fibers completely matched a direction of a line connecting the center of the circle and the center of the optical fiber.

Conditions of an assist gas inlet port including a nozzle and assist gas, and a method of driving a two-dimensional translation stage were the same as those of Example 1. The focusing optical system having an image formation magnification of 1, which is the same as that used in Example, was used, and an effective diameter of the laser beam group at the focus position at which the optical fiber outlet just formed an image was 330 µm. Note that, in this Example, the focus position was set to a position 8 mm below the surface of the test piece (that is, inside the test piece).

With the use of a beam pattern in a basic shape of hexagon and dodecagon, in order to observe influence on cut surface roughness when cutting the test piece in various directions, experiments were carried out as shown in FIG. 20, by changing a cutting direction angle θ which was defined with respect to a reference direction of the beam pattern (direction connecting the center of the beam spot $S_0$ and the center of the beam spot $S_1$).

As Comparative Example, the same cutting as the above Example of the present invention was performed by focusing one non-polarized laser beam emitted from one fiber laser using completely identical focusing optical system. The spot diameter of the laser beam was a circle having a diameter of 300 nm, had a beam quality (BPP) of 4 mm·mrad, and had a beam power of 7600 W. The diameter (300 nm) and the total power (7600 W=400 W×19) were adjusted to approximately the same conditions as in the above Example of the present invention.

As the test piece, stainless steel SUS304 having a thickness of 12 mm was used. The evaluation of the cut surface roughness was conducted by measuring ten-point average roughness $R_{ZJIS}$ (JIS B 0601-2001) along the line of the central part (depth of 6 mm from the surface) in the thickness direction of the test piece, using a contact type roughness meter.

Figure 21:
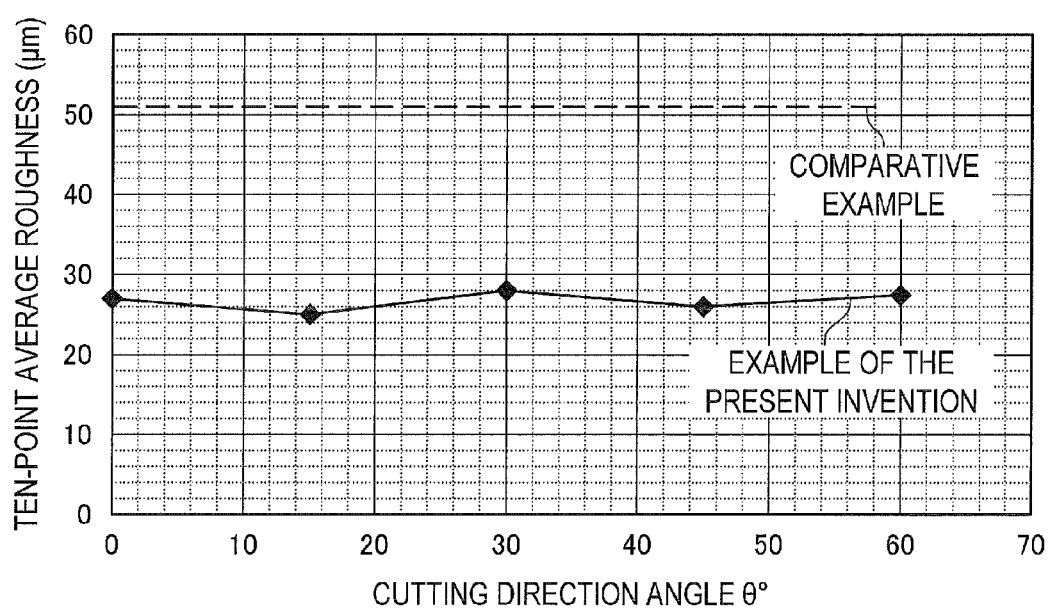
FIG. 21 is a graph showing measurement results of roughness of a side part of a kerf.

FIG. 21 shows measurement results of cut surface roughness in Example of the present invention and Comparative Example. The cutting speed was 2 m/min for all conditions. As it is clear from the comparison of measurement results of Example of the present invention and Comparative Example shown in FIG. 21, while the cut surface roughness of Comparative Example is about 52 nm, the cut surface roughness of Example of the present invention is about 24 nm to 28 nm, and hence, it is found that the cut surface roughness is suppressed in Example of the present invention compared to Comparative Example. Further, as it is clear from the results of Example of the present invention, with the use of 19 beams, uniform cutting quality further independent on the cutting direction angle θ could be obtained compared to Example 1 in which six beams were used. In this way, it was proved that the laser processing apparatus and the laser processing method according to an embodiment of the present invention were also effective for reducing cut surface roughness in cutting a thick steel plate.

Example 3

Next, a performance confirmation test was carried out on the form in which, as shown in FIG. 11, multiple parallel laser beams emitted from multiple fiber lasers were focused by one focusing lens, and the beam spots focused from those multiple laser beams were placed on at least one ring at processing point. In this Example, as shown in FIG. 12, a laser processing apparatus having a pattern formed of seven circular beam spots was manufactured. The fiber laser corresponding to the beam spot at the center was made a non-polarized fiber laser, and a usual polarization-independent optical fiber was used to transmit this laser beam. The laser beams of the fiber laser corresponding to the six beam spots placed on a ring were all linearly polarized light beams, and were independently transmitted through polarization maintaining fibers. As shown in FIG. 11, the collimators 151 were connected to the respective outlets of the seven optical fibers, and it was set in a manner that seven parallel laser beams were emitted from the collimators 151. The seven collimators 151 were fixed by the collimator fixing holder 153. In this case, the linear polarization directions of the six laser beams emitted from the six collimators 151 placed in the outer ring shape were set to be completely in radial form. That is, a linear polarization direction of each of the six laser beams completely matched a direction of a line connecting the center of the ring and the center of the laser beam.

The laser beams used in the laser processing apparatus were each a continuous wave laser beam, and all seven laser beams had common characteristics. The laser beam emitted from each of the seven collimators 151 had a beam quality (BPP) of 0.4 mm·mrad, and a maximum power of 400 W. The beam diameters of the seven parallel laser beams emitted from the collimators 151 were each 4.9 mm. Further, the distance between the center of the laser beam at the center and each of the centers of the six laser beams placed in the ring shape was 15 mm, and the diameter of the circle passing through the centers of the six laser beams placed in a ring shape was 30 mm. As the focusing lens 131, there was used a spherical planoconvex lens made of fused silica that is commercially available. The lens had a focal length of 300 mm.

As the test piece, stainless steel SUS304 having a thickness of 5 mm was used. Conditions of an assist gas inlet port including a nozzle and assist gas, and a method of driving a two-dimensional translation stage were the same as those of Example 1.

The focus position of the laser beam placed at the center of the ring was set to a position 2 mm below the surface of the test piece (that is, inside the test piece). As a result thereof, as a pattern of the seven beam spots on the surface of the test piece, the following pattern was obtained: a beam spot corresponding to a non-polarized laser beam was placed at the center, the non-polarized laser beam being placed at a center and having a beam diameter of 120 nm; and, onto a ring having its center at this non-polarized beam spot and having a radius of 60 nm, six beam spots were placed, the six beam spots corresponding to six laser beams having linear polarizations completely in a radial form around the center. Regarding the shapes of the beam spots of the six laser beams on the surface of the test piece, although the beam diameter in a radial direction around the center of the ring slightly differed from the beam diameter in a perpendicular direction to the radial direction, the diameter on the average was 110 nm. Accordingly, the effective diameter of the laser beam group on the surface of the workpiece was 230 nm. The power of each of the seven laser beams was 360 W, and the total power was 2520 W.

Figure 22:
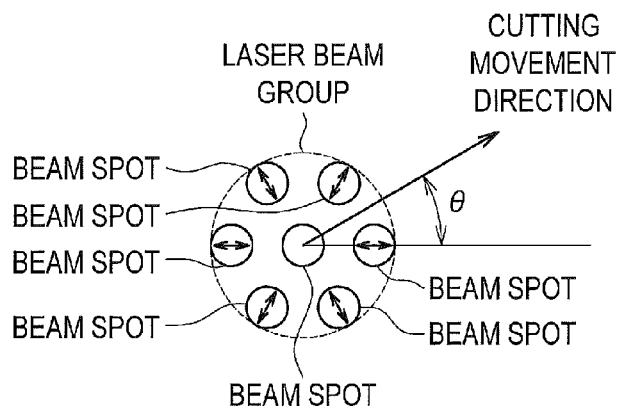
FIG. 22 is an explanatory diagram illustrating a processing head according to Example 3.

In the same manner as Example 1 and Example 2, in order to observe influence on cut surface roughness when cutting the test piece in various directions, experiments were carried out as shown in FIG. 22, by changing a cutting direction angle θ which was defined with respect to a reference direction of the beam pattern (direction connecting the center of a certain circular beam pattern and the center of the hexagon).

As Comparative Example, the same cutting as Example 3 was performed by focusing one non-polarized laser beam emitted from one fiber laser using the spherical planoconvex lens having a focal length of 300 mm in the same manner as above. The spot diameter of the laser beam was a circle having a diameter of 250 nm, had a beam quality (BPP) of 1.2 mm·mrad, and had a beam power of 2500 W. The diameter (250 nm) and the total power (2500 W) were adjusted to approximately the same conditions as in Example 3.

The evaluation of the cut surface roughness was conducted by measuring ten-point average roughness $R_{ZJIS}$ (JIS B 0601-2001) along the line of the central part (depth of 2.5 mm from the surface) in the thickness direction of the test piece, using a contact type roughness meter.

Figure 23:
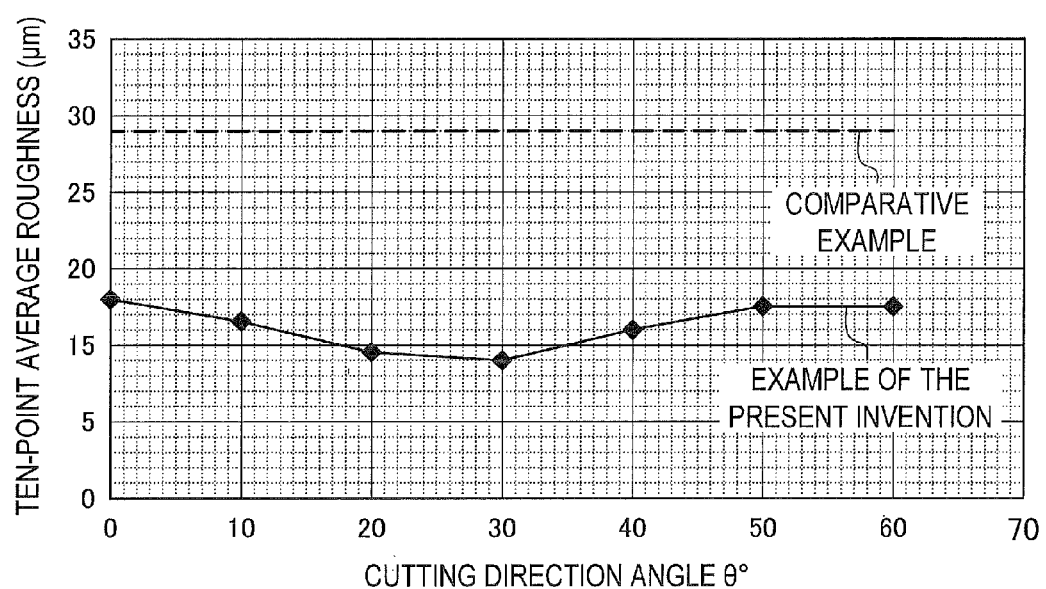
FIG. 23 is a graph showing measurement results of roughness of a side part of a kerf.

FIG. 23 shows measurement results of cut surface roughness in Example of the present invention and Comparative Example. The cutting speed was 2.2 m/min for all conditions. Since Comparative Example uses one laser beam and the focused beam pattern is originally isotropic, evaluation is conducted for cutting in only one direction. As it is clear from the comparison of measurement results of Example of the present invention and Comparative Example shown in FIG. 23, while the cut surface roughness of Comparative Example is about 29 μm, the cut surface roughness of Example of the present invention is about 14 μm to 18 μm, and hence, it is found that the cut surface roughness is suppressed in Example of the present invention compared to Comparative Example. It is found that the effect of suppressing cut surface roughness in this Example is approximately the same as the roughness-suppressing effect in Example 1 shown in FIG. 19.

Heretofore, according to the modified examples of an embodiment of the present invention in which the multiple emitted parallel laser beams were focused using the focusing lens, it was confirmed that approximately the same roughness-suppressing effect could be obtained as the roughness-suppressing effect obtained by the form shown in FIG. 4, the form shown in FIG. 4 being as follows: that an image of the beam spot pattern obtained by bundling the multiple fiber outlets was formed on the processing surface using the collimator lens and the focusing lens. That is, as the modified examples of the present embodiment described using FIGS. 11 to 17, it has been found that, when laser beams placed on a ring are transmitted from the focusing lens to the surface of the workpiece, the roughness-reducing effects are approximately the same between: the case where the optical axes of the laser beams are slightly titled with respect to the central axis of the ring; and the case where, as the first example of the present embodiment shown in FIG. 4 and FIG. 8, the optical axes of the laser beams placed on the ring are almost parallel with respect to the central axis of the ring.

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

REFERENCE SIGNS LIST

10 kerf
11 kerf front
13 kerf front surface
15 side part
17 liquid drop
100 laser processing apparatus
101 laser oscillator
103 optical fiber
105 apparatus body
107 processing head
109 guide rail
121 cylinder
123 nozzle
125 optical fiber fixing holder
127 focusing optical system
129 collimator lens
131 focusing lens
133 assist gas inlet port
151 collimator
153 collimator fixing holder
155 wedge

The invention claimed is:

1. A laser processing apparatus which processes a workpiece by guiding polarized laser beams emitted from a laser oscillator, focusing the polarized laser beams, and irradiating a surface of the workpiece with the focused polarized laser beams, the laser processing apparatus comprising:
   at least one laser oscillator configured to emit polarized laser beams;
   a plurality of polarization maintaining optical fibers configured to transmit the emitted polarized laser beams, at the end of each optical fiber, a surface is formed that is perpendicular to the polarization direction of the linearly polarized light; and
   at least one optical element configured to focus the polarized laser beams emitted from the optical fibers and irradiate the surface of the workpiece with the focused polarized laser beams, wherein, at output ends of the optical fibers, the output ends of the plurality of optical fibers are placed in one or a plurality of ring shapes, wherein the polarized laser beams transmitted through the plurality of optical fibers placed on at least an outermost ring of the one or plurality of ring shapes each have a linear polarization, and polarization directions of the linearly polarized laser beams emitted from the output ends of the plurality of optical fibers are arranged radially around a center of the outermost ring, and wherein the polarized laser beams have an intensity of greater than or equal to 400 W per 1 mm of a thickness of the workpiece.

2. The laser processing apparatus according to claim 1, wherein one of the optical fibers is further placed at a central part of the ring.

3. The laser processing apparatus according to claim 1, wherein the output ends of the plurality of optical fibers are placed in a plurality of ring shapes which share a common center, and wherein, through the optical fibers placed in the ring shapes inside the outermost ring, the polarized laser beams are transmitted, the polarized laser beams having polarization directions arranged radially around a center of the ring.

4. The laser processing apparatus according to claim 1, further comprising:

at least one laser oscillator configured to emit non-polarized laser beams;

a plurality of optical fibers configured to transmit the emitted non-polarized laser beams, wherein the output ends of the plurality of optical fibers are placed in a plurality of ring shapes which share a common center, and wherein, through the optical fibers placed in the ring shapes inside the outermost ring, laser beams are transmitted, the laser beams being non-polarized laser beams.

5. The laser processing apparatus according to claim 1, wherein the at least one optical element includes a collimator lens that changes the polarized laser beams emitted from the optical fibers into parallel light beams, and a focusing lens that focuses the parallel light beams emitted from the collimator lens.

6. The laser processing apparatus according to claim 5, wherein the plurality of optical fibers are connected to a collimator fixing holder in which a plurality of collimators each having the collimator lens are placed in one or a plurality of ring shapes, wherein the focusing lens is a spherical lens having spherical aberration or an aspherical lens having a predetermined curved surface, and wherein the polarized laser beams emitted from the focusing lens are focused and the surface of the workpiece is irradiated with the focused polarized laser beams.

7. A laser processing method for processing a workpiece by guiding polarized laser beams emitted from a laser oscillator, focusing the polarized laser beams, and irradiating a surface of the workpiece with the focused polarized laser beams, the laser processing method comprising:

transmitting polarized laser beams emitted from at least one laser oscillator through a plurality of polarization maintaining optical fibers, and, by using at least one optical element that focuses the polarized laser beams and irradiates the surface of the workpiece with the focused polarized laser beams, focusing the polarized laser beams emitted from the respective optical fibers, and irradiating the surface of the workpiece with the focused polarized laser beams, wherein, at output ends of the optical fibers, the output ends of the plurality of optical fibers are placed in one or a plurality of ring shapes, wherein the polarized laser beams transmitted through the plurality of optical fibers placed on at least an outermost ring of the one or plurality of ring shapes each have a linear polarization, and polarization directions of the linearly polarized laser beams emitted from the output ends of the plurality of optical fibers are arranged radially around a center of the outermost ring, and wherein the polarized laser beams have an intensity of greater than or equal to 400 W per 1 mm of a thickness of the workpiece.

8. The laser processing method according to claim 7, wherein one of the optical fibers is further placed at a central part of the ring.

9. The laser processing method according to claim 7, wherein the output ends of the plurality of optical fibers are placed in a plurality of ring shapes which share a common center, and wherein, through the optical fibers placed in the ring shapes inside the outermost ring, the polarized laser beams are transmitted, the polarized laser beams having polarization directions arranged radially around a center of the ring.

10. The laser processing method according to claim 7, further comprising:

at least one laser oscillator configured to emit non-polarized laser beams;

a plurality of optical fibers configured to transmit the emitted non-polarized laser beams, wherein the output ends of the plurality of optical fibers are placed in a plurality of ring shapes which share a common center, and wherein, through the optical fibers placed in the ring shapes inside the outermost ring, laser beams are transmitted, the laser beams being non-polarized laser beams.

11. The laser processing method according to claim 7, wherein the at least one optical element includes a collimator lens that changes the polarized laser beams emitted from the optical fibers into parallel light beams, and a focusing lens that focuses the parallel light beams emitted from the collimator lens.

12. The laser processing method according to claim 11, wherein the plurality of optical fibers are connected to a collimator fixing holder in which a plurality of collimators each having the collimator lens are placed in one or a plurality of ring shapes, wherein the focusing lens is a spherical lens having spherical aberration or an aspherical lens having a predetermined curved surface, and wherein the polarized laser beams emitted from the focusing lens are focused and the surface of the workpiece is irradiated with the focused polarized laser beams.

13. A laser processing apparatus which processes a workpiece by guiding polarized laser beams emitted from a laser oscillator, focusing the polarized laser beams, and irradiating a surface of the workpiece with the focused polarized laser beams, the laser processing apparatus comprising:

at least one laser oscillator configured to emit polarized laser beams;

a plurality of polarization maintaining optical fibers configured to transmit the emitted polarized laser beams, at the end of each optical fiber, a surface is formed that is perpendicular to the polarization direction of the linearly polarized light; and at least one optical element configured to focus the polarized laser beams emitted from the optical fibers and irradiate the surface of the workpiece with the focused polarized laser beams, wherein, at output ends of the optical fibers, the output ends of the plurality of optical fibers are placed in one or a plurality of ring shapes, wherein the polarized laser beams transmitted through the plurality of optical fibers placed on at least an outermost ring of the one or plurality of ring shapes each have a linear polarization, and polarization directions of the linearly polarized laser beams emitted from the output ends of the plurality of optical fibers are arranged radially around a center of the outermost ring.

14. The laser processing apparatus according to claim 13, wherein one of the optical fibers is further placed at a central part of the ring.

15. The laser processing apparatus according to claim 13,
wherein the output ends of the plurality of optical fibers are placed in a plurality of ring shapes which share a common center, and wherein, through the optical fibers placed in the ring shapes inside the outermost ring, the polarized laser beams are transmitted, the polarized laser beams having polarization directions arranged radially around a center of the ring.

16. The laser processing apparatus according to claim 13, further comprising:
at least one laser oscillator configured to emit non-polarized laser beams;
a plurality of optical fibers configured to transmit the emitted non-polarized laser beams,
wherein the output ends of the plurality of optical fibers are placed in a plurality of ring shapes which share a common center, and
wherein, through the optical fibers placed in the ring shapes inside the outermost ring, laser beams are transmitted, the laser beams being non-polarized laser beams.

17. The laser processing apparatus according to claim 13,
wherein the at least one optical element includes a collimator lens that changes the polarized laser beams emitted from the optical fibers into parallel light beams, and a focusing lens that focuses the parallel light beams emitted from the collimator lens.

18. The laser processing apparatus according to claim 17,
wherein the plurality of optical fibers are connected to a collimator fixing holder in which a plurality of collimators each having the collimator lens are placed in one or a plurality of ring shapes,
wherein the focusing lens is a spherical lens having spherical aberration or an aspherical lens having a predetermined curved surface, and
wherein the polarized laser beams emitted from the focusing lens are focused and the surface of the workpiece is irradiated with the focused polarized laser beams.

19. A laser processing method for processing a workpiece by guiding polarized laser beams emitted from a laser oscillator, focusing the polarized laser beams, and irradiating a surface of the workpiece with the focused polarized laser beams, the laser processing method comprising:
transmitting polarized laser beams emitted from at least one laser oscillator through a plurality of polarization maintaining optical fibers, at the end of each optical fiber, a surface is formed that is perpendicular to the polarization direction of the linearly polarized light, and, by using at least one optical element that focuses the polarized laser beams and irradiates the surface of the workpiece with the focused polarized laser beams, focusing the polarized laser beams emitted from the respective optical fibers, and irradiating the surface of the workpiece with the focused polarized laser beams, wherein, at output ends of the optical fibers, the output ends of the plurality of optical fibers are placed in one or a plurality of ring shapes, wherein the polarized laser beams transmitted through the plurality of optical fibers placed on at least an outermost ring of the one or plurality of ring shapes each have a linear polarization, and polarization directions of the linearly polarized laser beams emitted from the output ends of the plurality of optical fibers are arranged radially around a center of the outermost ring.

20. The laser processing method according to claim 19, wherein one of the optical fibers is further placed at a central part of the ring.

21. The laser processing method according to claim 19,
wherein the output ends of the plurality of optical fibers are placed in a plurality of ring shapes which share a common center, and
wherein, through the optical fibers placed in the ring shapes inside the outermost ring, the polarized laser beams are transmitted, the polarized laser beams having polarization directions arranged radially around a center of the ring.

22. The laser processing method according to claim 19, further comprising:
at least one laser oscillator configured to emit non-polarized laser beams;
a plurality of optical fibers configured to transmit the emitted non-polarized laser beams,
wherein the output ends of the plurality of optical fibers are placed in a plurality of ring shapes which share a common center, and
wherein, through the optical fibers placed in the ring shapes inside the outermost ring, laser beams are transmitted, the laser beams being non-polarized laser beams.

23. The laser processing method according to claim 19,
wherein the at least one optical element includes a collimator lens that changes the polarized laser beams emitted from the optical fibers into parallel light beams, and a focusing lens that focuses the parallel light beams emitted from the collimator lens.

24. The laser processing method according to claim 23,
wherein the plurality of optical fibers are connected to a collimator fixing holder in which a plurality of collimators each having the collimator lens are placed in one or a plurality of ring shapes,
wherein the focusing lens is a spherical lens having spherical aberration or an aspherical lens having a predetermined curved surface, and
wherein the polarized laser beams emitted from the focusing lens are focused and the surface of the workpiece is irradiated with the focused polarized laser beams.

25. A laser processing apparatus which processes a workpiece by guiding polarized laser beams emitted from a laser oscillator, focusing the polarized laser beams, and irradiating a surface of the workpiece with the focused polarized laser beams, the laser processing apparatus comprising:
at least one laser oscillator configured to emit polarized laser beams;
a plurality of polarization maintaining optical fibers configured to transmit the emitted polarized laser beams, at the end of each optical fiber, a surface is formed that is perpendicular to the polarization direction of the linearly polarized light; and at least one optical element configured to focus the polarized laser beams emitted from the optical fibers and irradiate the surface of the workpiece with the focused polarized laser beams, wherein, at output ends of the optical fibers, the output ends of the plurality of optical fibers are placed in one or a plurality of ring shapes, wherein the polarized laser beams transmitted through the plurality of optical fibers placed on at least an outermost ring of the one or plurality of ring shapes each have a linear polarization, and polarization directions of the linearly polarized laser beams emitted from the output ends of the plurality of optical fibers are arranged radially around a center of the outermost ring, and wherein the polarized laser beams have an intensity sufficient to cut the workpiece.

26. A laser processing method for processing a workpiece by guiding polarized laser beams emitted from a laser oscillator, focusing the polarized laser beams, and irradiating a surface of the workpiece with the focused polarized laser beams, the laser processing method comprising:

transmitting polarized laser beams emitted from at least one laser oscillator through a plurality of polarization maintaining optical fibers, each fiber having a surface that is perpendicular to the polarization direction of the linearly polarized light at the end, and, by using at least one optical element that focuses the polarized laser beams and irradiates the surface of the workpiece with the focused polarized laser beams, focusing the polarized laser beams emitted from the respective optical fibers, and irradiating the surface of the workpiece with the focused polarized laser beams, wherein, at output ends of the optical fibers, the output ends of the plurality of optical fibers are placed in one or a plurality of ring shapes, wherein the polarized laser beams transmitted through the plurality of optical fibers placed on at least an outermost ring of the one or plurality of ring shapes each have a linear polarization, and polarization directions of the linearly polarized laser beams emitted from the output ends of the plurality of optical fibers are arranged radially around a center of the outermost ring, and wherein irradiating the surface of the workpiece comprises cutting the workpiece.

27. A laser processing apparatus which processes a workpiece by guiding polarized laser beams emitted from a laser oscillator, focusing the polarized laser beams, and irradiating a surface of the workpiece with the focused polarized laser beams, the laser processing apparatus comprising:

at least one laser oscillator configured to emit polarized laser beams;

a plurality of polarization maintaining optical fibers configured to transmit the emitted polarized laser beams, at the end of each optical fiber, a surface is formed that is perpendicular to the polarization direction of the linearly polarized light; and at least one optical element configured to focus the polarized laser beams emitted from the optical fibers and irradiate the surface of the workpiece with the focused polarized laser beams, wherein, at output ends of the optical fibers, the output ends of the plurality of optical fibers are placed in one or a plurality of ring shapes, wherein the polarized laser beams transmitted through the plurality of optical fibers placed on at least an outermost ring of the one or plurality of ring shapes each have a linear polarization, and polarization directions of the linearly polarized laser beams emitted from the output ends of the plurality of optical fibers are arranged radially around a center of the outermost ring, and wherein the polarized laser beams have an power of greater than or equal to 2000 W.

28. A laser processing method for processing a workpiece by guiding polarized laser beams emitted from a laser oscillator, focusing the polarized laser beams, and irradiating a surface of the workpiece with the focused polarized laser beams, the laser processing method comprising:

transmitting polarized laser beams emitted from at least one laser oscillator through a plurality of polarization maintaining optical fibers, at the end of each optical fiber, a surface is formed that is perpendicular to the polarization direction of the linearly polarized light, and, by using at least one optical element that focuses the polarized laser beams and irradiates the surface of the workpiece with the focused polarized laser beams, focusing the polarized laser beams emitted from the respective optical fibers, and irradiating the surface of the workpiece with the focused polarized laser beams, wherein, at output ends of the optical fibers, the output ends of the plurality of optical fibers are placed in one or a plurality of ring shapes, wherein the polarized laser beams transmitted through the plurality of optical fibers placed on at least an outermost ring of the one or plurality of ring shapes each have a linear polarization, and polarization directions of the linearly polarized laser beams emitted from the output ends of the plurality of optical fibers are arranged radially around a center of the outermost ring, and wherein the laser beams have an power of greater than or equal to 2000 W.

* * * * *